United States Patent
Makino et al.

(10) Patent No.: US 6,850,282 B1
(45) Date of Patent: Feb. 1, 2005

(54) REMOTE CONTROL OF IMAGE SENSING APPARATUS

(75) Inventors: Jun Makino, Kawasaki (JP); Shinichi Koyama, Kawasaki (JP); Yoshitaka Takeuchi, Kodaira (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/324,163

(22) Filed: Jun. 2, 1999

(30) Foreign Application Priority Data

Jun. 2, 1998 (JP) .......................................... 10-153262
Jun. 19, 1998 (JP) .......................................... 10-173005
Sep. 25, 1998 (JP) .......................................... 10-272276

(51) Int. Cl.$^7$ ............................................. H04N 5/222
(52) U.S. Cl. ..................................... 348/371; 348/370
(58) Field of Search ................................ 348/371, 296, 348/317, 64, 220.1, 221.1, 211.5, 333.02, 370

(56) References Cited

U.S. PATENT DOCUMENTS

| | | | | |
|---|---|---|---|---|
| 4,805,037 A | * | 2/1989 | Noble et al. | ................. 348/371 |
| 5,006,871 A | * | 4/1991 | Noble | ......................... 348/64 |
| 5,008,697 A | * | 4/1991 | Noble | ......................... 348/296 |
| 5,479,206 A | * | 12/1995 | Ueno et al. | ............ 348/333.02 |
| 5,751,348 A | * | 5/1998 | Inuiya et al. | ............ 348/220.1 |
| 5,828,406 A | * | 10/1998 | Parulski et al. | .......... 348/220.1 |
| 6,278,490 B1 | * | 8/2001 | Fukuda et al. | .............. 348/370 |
| 6,466,263 B1 | * | 10/2002 | Suzuki | .................... 348/220.1 |

* cited by examiner

Primary Examiner—Aung Moe
(74) Attorney, Agent, or Firm—Morgan & Finnegan, LLP

(57) ABSTRACT

In a method having an image sensor capable of selectively sensing an image in progressive scanning method and in interlace scanning method, when performing an image sensing operation using an electronic flash, if the image sensing operation is performed in the progressive scanning method, the electronic flash is controlled to flash once for each frame, and if the image sensing operation is performed in the interlace scanning method, the electronic flash is controlled to flash twice for each frame, once for each field.

40 Claims, 24 Drawing Sheets

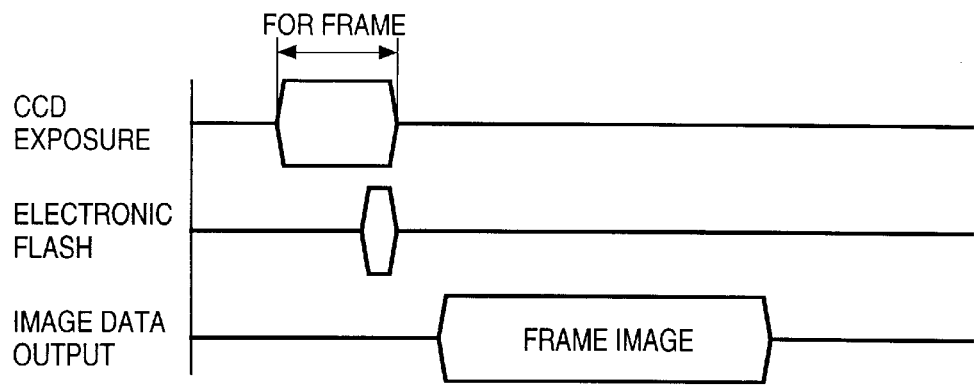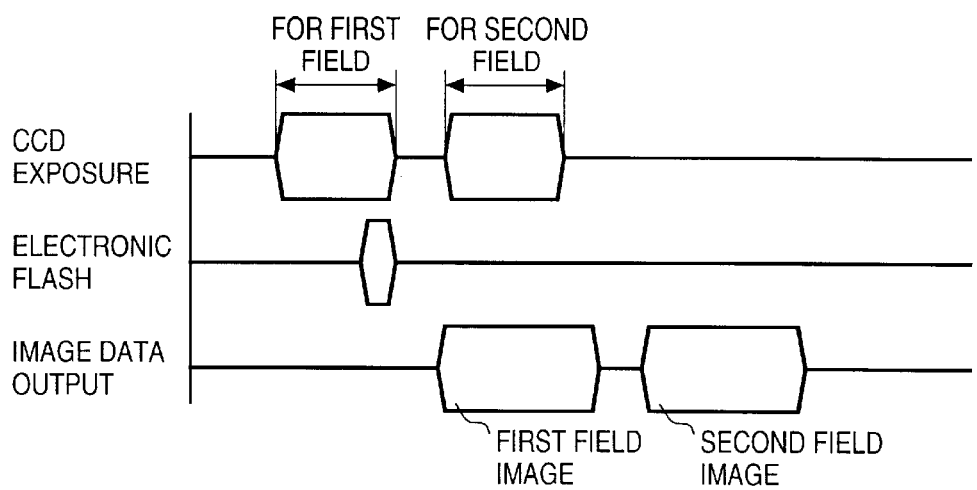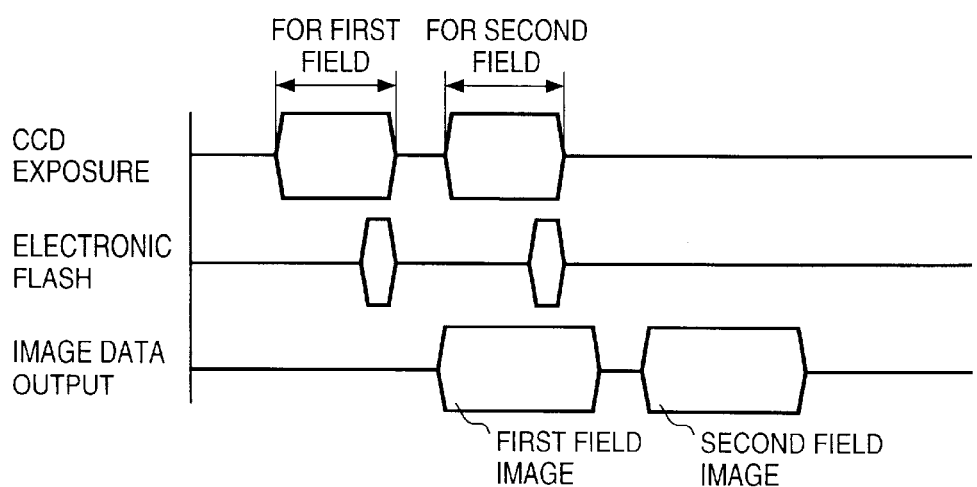

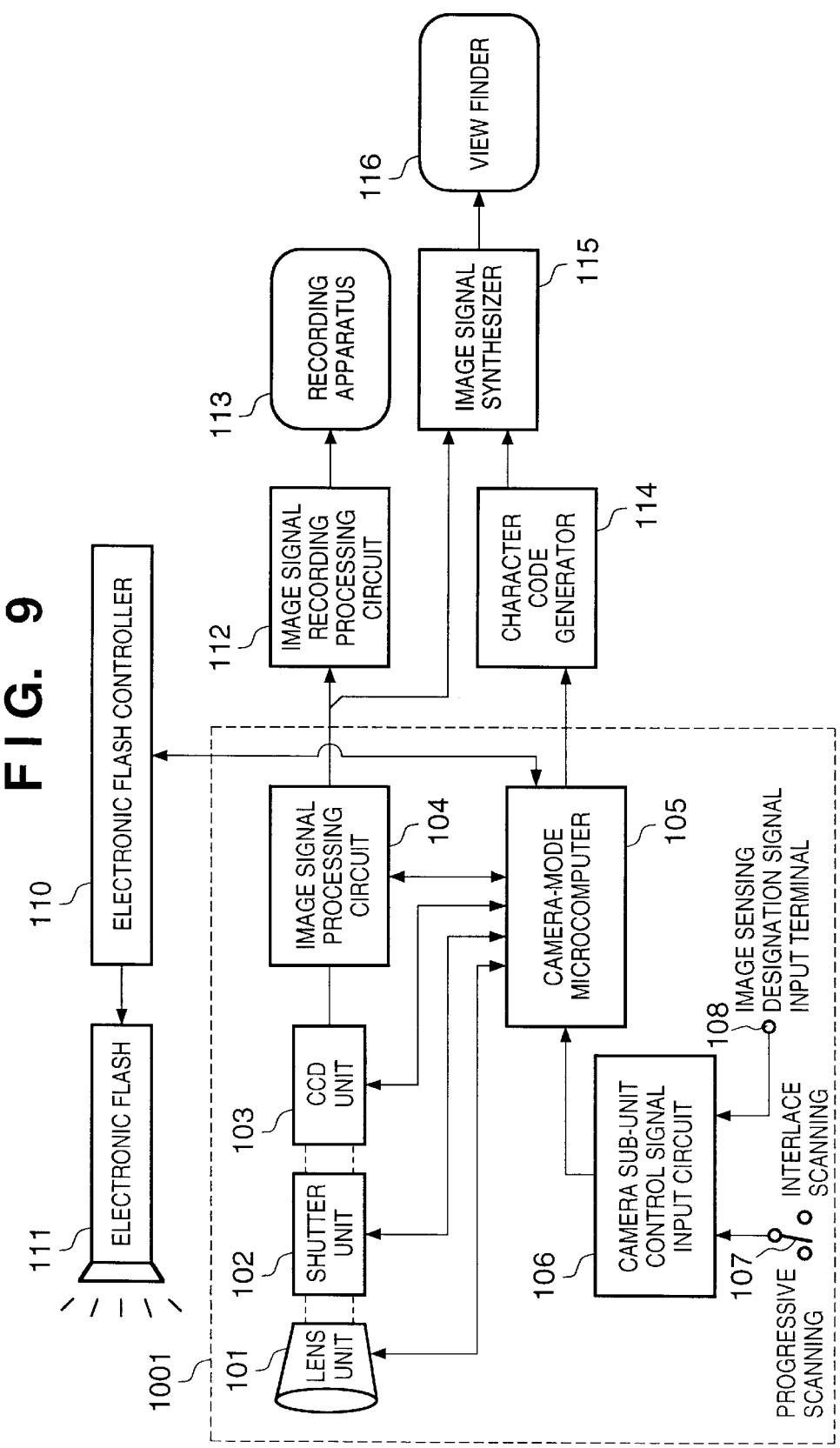

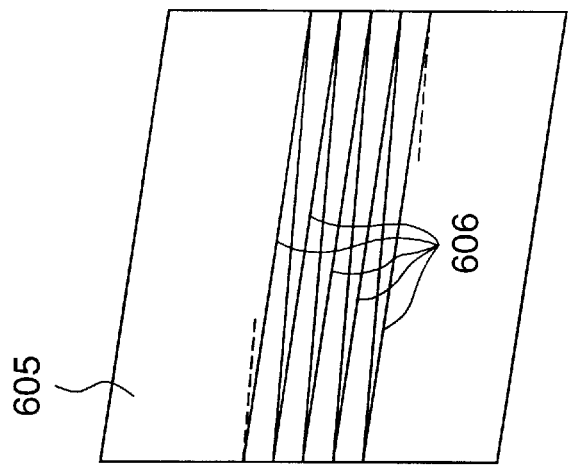
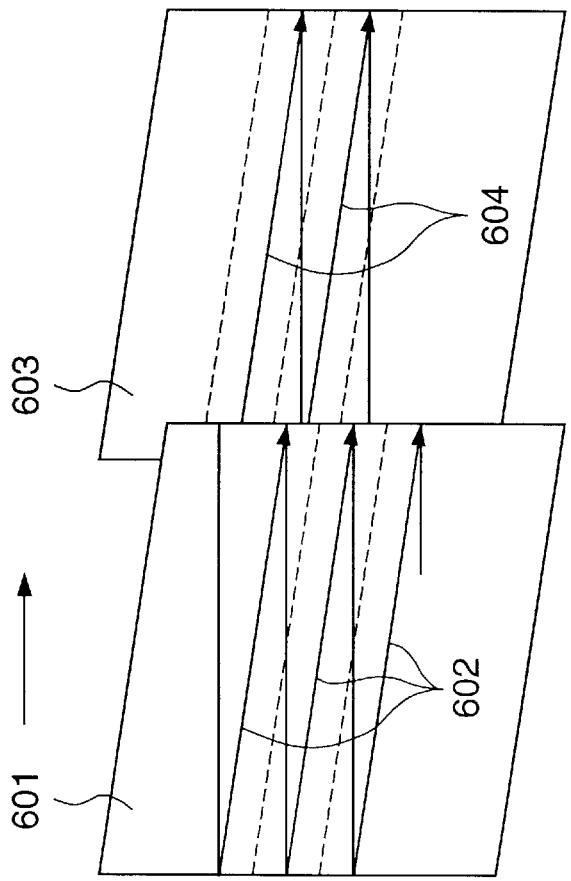

REMOTE CONTROL OF IMAGE SENSING APPARATUS

BACKGROUND OF THE INVENTION

The present invention relates to an image sensing system configured with an image sensing apparatus and a control apparatus, a method of controlling an image sensing system, and a storage medium storing the method.

As conventional video cameras, on the market, which record an image as television signals, there are analog video cameras (e.g., HI-8 type, VHS type) and digital video cameras (e.g., DV type).

In these video cameras, a charge coupled device (CCD) is often used as an image sensing device. Referring to FIG. 23A, in the conventional video cameras, in order to output a moving image as television signals, the CCD is scanned every other scan line as shown by interlace scanning lines 602 to form a first field image 601, then the skipped lines are scanned as shown by interlace scan lines 604 to form a second field image 602. The first and second field images 601 and 602 together form a frame image (interlace scanning).

In the aforesaid interlace scanning method, there is a problem in which, when outputting a frame (configured with two field images) of a fast moving image as a still image, the outputted still image is mismatched because of a difference between the two field images due to the movement associated with a lapse of time. Thus, as a video camera capable of overcoming the above problem, one which sequentially scans all the scan lines 606 to form a frame image 605 as shown in FIG. 23B has recently been on the market (progressive scanning).

Currently, among electronic flashes provided on the aforesaid video cameras, those provided on video cameras performing progressive scanning flash once for each exposure operation for each frame at timing shown in FIG. 5.

Further, in a conventional video camera which performs interlace scanning and outputs two field images as a still image of a frame, there is a problem in which, with only one flashing operation in each frame, the outputted still image is disturbed since one field image is obtained while flashing the electronic flash, whereas the other filed image is obtained without flashing the electronic flash, as shown in FIG. 6, and bright lines and dark lines are mixed every other line.

Meantime, there is a technique for sensing an image with special effects by optically transforming an image by parallel-shifting and/or tilting the optical axis of an image sensing lens. This technique is conventionally known as camera movements. As the camera movements, the parallel translation of a lens in the horizontal direction with respect to the optical axis of the lens is called shift, the parallel translation in the vertical direction is called rise and fall, and the tilting operations of the lens about an axis which is orthogonal to the optical axis in the horizontal and vertical directions are called swing and tilt, respectively.

Further, an image sensed by a video camera is often transferred to a control apparatus, such as a personal computer, via communication means. Furthermore, there are systems in which an image sensing operation of a video camera is controlled by a personal computer from a remote location.

As an example of such systems, a video camera recorder is connected to a personal computer via a cable, e.g., conforming to IEEE 1394 standard and universal serial bus (USB), and while watching an image sensed by the video camera recorder and displayed on the personal computer, a user controls the operation, such as start and stop of image recording, playback of a sensed image, of the video camera recorder from the personal computer with a command transaction set (CTS), further, edits the sensed image on the personal computer.

For interchanging image information and other information between a video camera and a personal computer, the IEEE 1394 standard is prescribed as described above. According to the IEEE 1394 standard, when transferring information, such as image information from a video camera, which requires a fixed transfer rate, isochronous transference is performed, and when transferring other data, asynchronous transference is performed and data is transferred by packet. As a communication protocol, conforming to the IEEE 1394 standard, which determines a format and sequence of information for controlling a video camera, there is an audio video control (AVC) protocol.

Below, a conventional system in which a digital video camera is remote-controlled by a personal computer is explained with reference to the block diagram shown in FIG. 24.

In FIG. 24, reference numeral 1 denotes a digital video camera; 2, a cable conforming to the IEEE 1394 standard; and 3, a personal computer. The CTS is explained, first. In the IEEE 1394 standard, the physical layer, the link layer, and the transaction layer are prescribed by the "IEEE 1394-1995Std", and a function control protocol (FCP) for controlling devices is prescribed by the "IEC61883CDV" as an upper layer.

In the IEEE 1394 standard, a device controlling another device is called "controller", and a device controlled by another device is called "target". In FIG. 24, the personal computer 3 is the controller, and the digital video camera 1 is the target.

As shown in FIG. 25, the controller writes a command to the target by performing write transaction in asynchronous communication according to the IEEE 1394 standard, and the target sends back an acknowledge. Thereafter, the target writes a response to the command to the controller in the similar manner, and the controller also sends back an acknowledge. In the FCP, a command group, called CTS, which is prescribed by the AVC protocol is used in a general-purpose digital video camera recorder, such as the digital video camera 1.

The command group, CTS, defines a sub-unit of the video camera recorder, and control commands, such as REC, PLAY, and STOP, are prepared. These commands are transmitted from the personal computer to the digital video camera 1, which is controlled in accordance with the transmitted commands.

Further, as the CTS, a status command for notifying the computer 3 of a state of the video camera 1 is also prepared so that the computer 3 can be made aware of the current mechanical conditions, such as a time code, of the video camera 1.

In addition, a notify command for inquiring a change in operation condition of the video camera 1 is also prepared as the CTS.

For sensing an image with camera movements by a conventional image sensing system as described above, a user manually controls a camera while checking the special effects on a transformed image caused by the camera movements.

In other words, it is not possible to control the movement of the lens of a video camera from a personal computer to acquire camera movement effects in a conventional image sensing system.

Therefore, for inputting an image with camera movements into the personal computer, it is necessary for a user to manually move the lens of the video camera, which is a troublesome operation.

Further, for confirming the effects of the camera movements on the personal computer, it is necessary to input an image sensed after moving the lens to the personal computer and display it on a display device; thus, a sequence of moving the lens, sensing an image, displaying the image, and confirming the image, has to be repeated a plurality of times. Furthermore, since the camera movements are manually controlled by the user, the amount of movement of the lens is not known by the personal computer.

Furthermore, if lens movement is automated and a system in which the lens is controlled by the personal computer is made, communication for transferring an image and communication for controlling the lens movement have to be performed via different means. Therefore, communication means for communication, such as a cable, needs to be provided independently, which increases the size of an apparatus and the apparatus may not be operated easily.

Further, there is a case of switching between a function of converting visual light into image signals and a function of converting infrared light into image signals, where both functions are provided in the digital video camera 1. However, these functions are not electronically controlled; therefore, the user has to directly operate a switch, provided on the digital video camera 1, for switching between the functions.

Below, the switching between the function of converting visual light into image signals and the function of converting infrared light into image signals in the digital video camera 1 is explained.

FIG. 26 is a block diagram illustrating a brief internal configuration of the digital video camera 1. In FIG. 26, reference numeral 31 denotes a lens; 32, an infrared filter for cutting infrared light; 33, a CCD; 34, a matrix operation circuit; 35, a recorder signal processing circuit; 36, a recorder; 37, a digital interface (DIF); 38, a microcomputer; 39, an actuator; and 40, a switch.

First, in a case of converting visual light into image signals, light passing through the lens 31 is filtered by the infrared filter 32 and the filtered visual light forms an image on the CCD 33. The CCD 33 converts the formed optical image into electric signals, and transmits the signals to the matrix operation circuit 34.

A complementary color filter is formed on the CCD 33 so that each color of the complementary color filter covers each pixels of the CCD, and light of different colors passed through the color filter are incidence on the respective pixels. The signals obtained from the respective pixels are operated in the matrix operation circuit 34, from which a luminance signal Y, and color difference signals R-Y and B-Y are outputted.

The luminance signal Y and the color difference signals R-Y and B-Y are inputted to the recorder signal processing circuit 35. The recorder signal processing circuit 35 converts the inputted image signals (i.e., the luminance signal Y and the color difference signals R-Y and B-Y) into signals of digital video format and provides the converted signals to the recorder 36 where the signals are recorded on a recording medium. At the same time, the signals of the-digital video format are also outputted from the DIF 37.

Next, in a case of converting infrared light into image signals, the user switches the switch 40 to perform infrared processing. In turn, the microcomputer 38 controls the actuator 39 so that the infrared filter 32 is removed out of a light path to the CCD 33 (moved in the direction shown in an arrow A in FIG. 26). Accordingly, light including infrared light incidents on the CCD 33 and converted into electric signals, then transmitted to the matrix operation circuit 34.

Next, the recorder signal processing circuit 35 is controlled so as to change the color difference signals R-Y and B-Y to express achromatic state, because a color component of infrared light is not visible. The subsequent processes are the same as those for processing image signals of visual light.

In the aforesaid manner, even when an image due to visual light is too dark for recognition of its contents, infrared light is converted into an image so that outlines of objects, at least, are clearly seen if infrared light is emitted.

However, in the aforesaid conventional system, there is no command from the personal computer 3 for switching between the function of converting visual light into image signals and the function of converting infrared light into image signals in the digital video camera 1. Therefore, the user has to manually operate the switch provided on the digital video camera 1.

Further, there is a problem in that, when a dark object in a dark place is sensed, an image obtained in the function of converting visual light into image signals does not clearly express outlines, whereas, an image obtained in the function of converting infrared light into image signals does not express color.

SUMMARY OF THE INVENTION

The present invention has been made in consideration of the above situation, and has as its object to stabilize effects of electronic flash on images sensed in interlace scanning.

According to the present invention, the foregoing object is attained by providing an image sensing apparatus comprising: an image sensor, capable of sensing an image in a first scanning method and a second scanning method selectively, for sensing the image of an object and outputting an image signal; selection means for selecting either the first scanning method or the second scanning method; an electronic flash for illuminating the object; and control means for controlling flash operation of the electronic flash in accordance with either the first or second scanning method selected by the selection means.

Further, the foregoing object is also attained by providing an image sensing method comprising: a selection step of selecting either a first scanning method or a second scanning method; a control step of controlling flash operation of an electronic flash in accordance with either the first or second scanning method selected in the selection step; and an image sensing step of sensing an image of an object in either the first or second scanning method selected in the selection step and outputting the image signal.

Furthermore, the foregoing object is also attained by providing a control apparatus for controlling an image sensing apparatus having: an image sensor, capable of sensing an image in a first scanning method and a second scanning method, selectively, for sensing the image of an object and outputting an image signal; selection means for selecting either the first scanning method or the second scanning method; an electronic flash for illuminating the object; and control means for controlling flash operation of the electronic flash in accordance with either the first or second scanning method selected by the selection means, the control apparatus comprising transmission means for transmitting a selection signal to the selection means.

Preferably, the first scanning method is progressive scanning method and the second scanning method is interlace scanning method, and, when the first scanning method is selected, the control means controls the electronic flash to flash once for each frame, and, when the second scanning method is selected, the control means controls the electronic flash to flash once for each field.

Further, preferably the selection means selects either the first or second scanning method on the basis of a selection signal inputted from outside.

Further, it is another object of the present invention to generate image information by controlling image sensing operation with camera movements in an image sensing apparatus from a control apparatus.

According to the present invention, the foregoing object is attained by providing an image sensing apparatus, remote-controlled by a control apparatus connected via a communication path, comprising: a lens unit capable of moving for camera movements; reception means for receiving a control signal for controlling camera movements of the lens unit from the control apparatus; and control means for controlling the lens unit on the basis of the control signal received by the reception means.

According to the present invention, the foregoing object is also attained by providing a control apparatus which remote-controls an image sensing apparatus, having a lens unit capable of moving for camera movements, connected via a communication path, comprising: generation means for generating a control signal for controlling the lens unit for camera movements; and transmission means for transmitting the control signal generated by the generation means.

Furthermore, the foregoing object is also attained by providing an image sensing system including an image sensing apparatus, having a lens unit capable of moving for camera movements, and a control apparatus connected via a communication path, wherein the control apparatus comprising: generation means for generating a control signal for controlling the lens unit for camera movements; and transmission means for transmitting the control signal generated by the generation means, and the image sensing apparatus comprising: reception means for receiving the control signal; and control means for controlling the lens unit on the basis of the control signal received by the reception means.

Further, the foregoing object is also attained by providing a method for remote-controlling a lens unit, capable of moving for camera movements, of an image sensing apparatus by a control apparatus connected via a communication path, comprising: a reception step of receiving a control signal for controlling camera movements of the lens unit from the control apparatus; and a control step of controlling the lens unit on the basis of the control signal received in the reception step.

Further, the foregoing object is also attained by providing a control method which remote-controls an image sensing apparatus, having a lens unit capable of moving for camera movements, via a communication path, comprising: a generation step of generating a control signal for controlling the lens unit for camera movements; and a transmission step of transmitting the control signal generated in the generation step.

Further, the foregoing object is also attained by providing a method for controlling an image sensing system including an image sensing apparatus, having a lens unit capable of moving for camera movements, and a control method connected via a communication path, the method comprising: a generation step of generating a control signal for controlling the lens unit for camera movements; a transmission step of transmitting the control signal generated in the generation step; a reception step of receiving the control signal; and a control step of controlling the lens unit on the basis of the control signal received in the reception step.

It is still another object of the present invention to make it possible for a control apparatus to confirm the amount of movement of a lens of an image sensing apparatus.

According to the present invention, the foregoing object is attained by adding output means for outputting information on the lens unit including an amount of movement of the lens unit for camera movements.

It is still another object of the present invention to predict a change of an image corresponding to movement of an image sensing lens on the basis of information on the distance to an object, the angle of view, and the focal length of the lens, transmitted from the image sensing apparatus, and display the image as changed.

According to the present invention, the foregoing object is attained by adding prediction means for predicting a change in an image corresponding to the camera movements on the basis of the distance to the object to be sensed, the angle of view, and the focal length of the lens unit transmitted in response to the second request command; and a display for displaying the change in the image predicted by the prediction means.

It is still another object of the present invention to make it possible to switch between a function of converting visual light into image signals and a function of converting infrared light into image signals in an image sensing apparatus from a control apparatus via a communication line.

It is still another object of the present invention to generate a clear image even when sensing a dark object in a dark place.

According to the present invention, the foregoing object is attained by providing an image sensing apparatus, remote-controlled by a control apparatus connected via a communication path, comprising: image sensing means capable of operating in a first conversion mode for converting visual light into image signals and in a second conversion mode for converting infrared light into image signals; reception means for receiving a control signal for switching between the first and second conversion modes of the image sensing means from the control apparatus; and control means for controlling the image sensing means on the basis of the control signal received by the reception means.

According to the present invention, the foregoing object is also attained by providing a control apparatus which remote-controls an image sensing apparatus, having image sensing means capable of operating in a first conversion mode for converting visual light into image signals and in a second conversion mode for converting infrared light into image signals, connected via a communication path, comprising: generation means for generating a control signal for switching between the first and second conversion modes of the image sensing means; and transmission means for transmitting the control signal generated by the generation means.

Furthermore, the foregoing object is also attained by providing an image sensing system including an image sensing apparatus having image sensing means capable of operating in a first conversion mode for converting visual light into image signals and in a second conversion mode for converting infrared light into image signals, and a control apparatus connected via a communication path, wherein the control apparatus comprising: generation means for generating a control signal for switching between the first and second conversion modes of the image sensing means; and transmission means for transmitting the control signal generated by the generation means, and the image sensing apparatus comprising: reception means for receiving the control signal; and control means for controlling the image sensing means on the basis of the control signal received by the reception means.

Further, the foregoing object is also attained by providing a method for remote-controlling image sensing means capable of operating in a first conversion mode for converting visual light into image signals and in a second conversion mode for converting infrared light into image signals, of an image sensing apparatus by a control apparatus connected via a communication path, comprising: a reception step of receiving a control signal for switching between the first and second conversion modes of the image sensing step from the control apparatus; and a control step of controlling the image sensing step on the basis of the control signal received in the reception step.

Further, the foregoing object is also attained by providing a control method for remote-controlling an image sensing apparatus, having image sensing means capable of operating in a first conversion mode for converting visual light into image signals and in a second conversion mode for converting infrared light into image signals, via a communication path, comprising: a generation step of generating a control signal for switching between the first and second conversion modes of the image sensing means; and a transmission step of transmitting the control signal generated in the generation step.

Further, the foregoing object is also attained by providing a method for controlling an image sensing system including an image sensing apparatus having image sensing means capable of operating in a first conversion mode for converting visual light into image signals and in a second conversion mode for converting infrared light into image signals, and a control method connected via a communication path, the method comprising: a generation step of generating a control signal for switching between the first and second conversion modes of the image sensing means; a transmission step of transmitting the control signal generated in the generation step; a reception step of receiving the control signal; and a control step of controlling the image sensing means on the basis of the control signal received in the reception step.

It is still another object of the present invention to generate an image with clear outline and colors even when sensing a dark object in a dark place.

According to the present invention, the foregoing object is attained by adding memory for storing the image signals acquired by the image sensing means; and combining means for, when the first conversion mode is switched to the second conversion mode or vice versa, combining image signals acquired after changing the conversion mode and the image signals stored in the memory.

It is still another object of the present invention where a user is informed, from an image sensing apparatus, that the image sensing apparatus is controlled via a communication line when it is under control.

According to the present invention, the foregoing object is attained by adding a display device for, when the image sensing apparatus is controlled by the control apparatus, displaying that it is under control of the control apparatus.

It is still another object of the present invention to save electric energy when an image sensing apparatus is controlled via a communication line.

According to the present invention, the foregoing object is attained by adding display control means for not providing electric power to the display when the image sensing apparatus is controlled by the control apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a timing chart for explaining operation of an electric flash;

FIG. 6 is a timing chart for explaining operation of an electric flash;

FIG. 7 is a flowchart for explaining operation of an electric flash according to the first embodiment of the present invention;

FIG. 9 is a block diagram illustrating an internal configuration of a video camera according to a modification of the first embodiment of the present invention;

FIGS. 23A and 23B are diagrams for explaining scanning methods to obtain television signals;

DETAILED DESCRIPTION OF THE PREFERRED EMBODIMENTS

Preferred embodiments of the present invention will be described in detail below in accordance with the accompanying drawings.

<First Embodiment>

Figure 1:
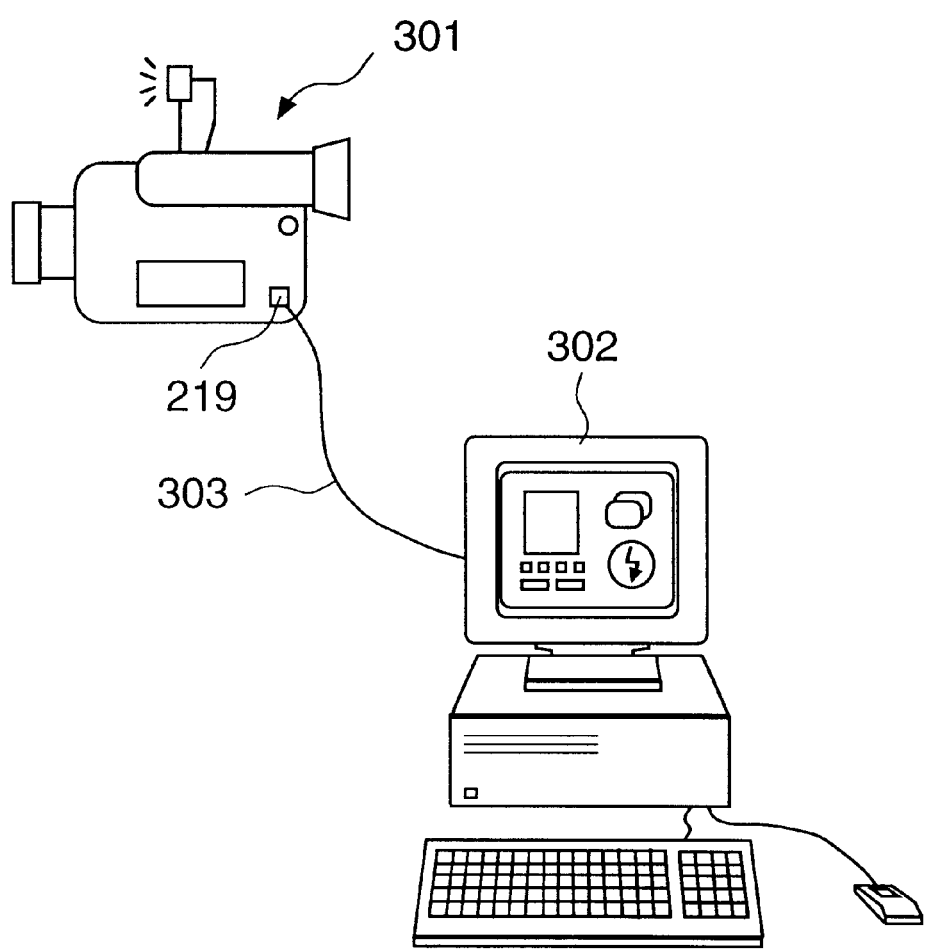
FIG. 1 is a view showing an overall configuration of a video camera system according to the first embodiment of the present invention.

The first embodiment of the present invention will be explained below with reference to FIGS. 1 to 8. FIG. 1 is an overall view of a video camera system, in which a video camera is controlled by a computer connected to the video camera via a digital communication line conforming to IEEE 1394 standard, capable of storing a sensed image both in a storage medium of a video camera and in a recording medium of the computer. Further, FIG. 2 is a block diagram illustrating an internal configuration of the video camera.

Referring to FIG. 1, when a video camera 301 is controlled by a computer 302, which is an external control apparatus, the computer 302 first generates a command for controlling the video camera 301 by executing an application software installed in the computer. Then, the generated command is transferred to the video camera 301 via a digital communication line 303 by a write transaction using asynchronous transference according to the IEEE 1394 standard; in turn, a camera-mode microcomputer 205 (shown in FIG. 2) in the video camera 301 controls operation of corresponding unit/units. Thereafter, the video camera 301 controlled by the command from the computer 302 transmits a response indicating that the corresponding operation is performed, to the computer 302; in turn, the computer 302 displays the control result on an attached monitor.

Figure 2:
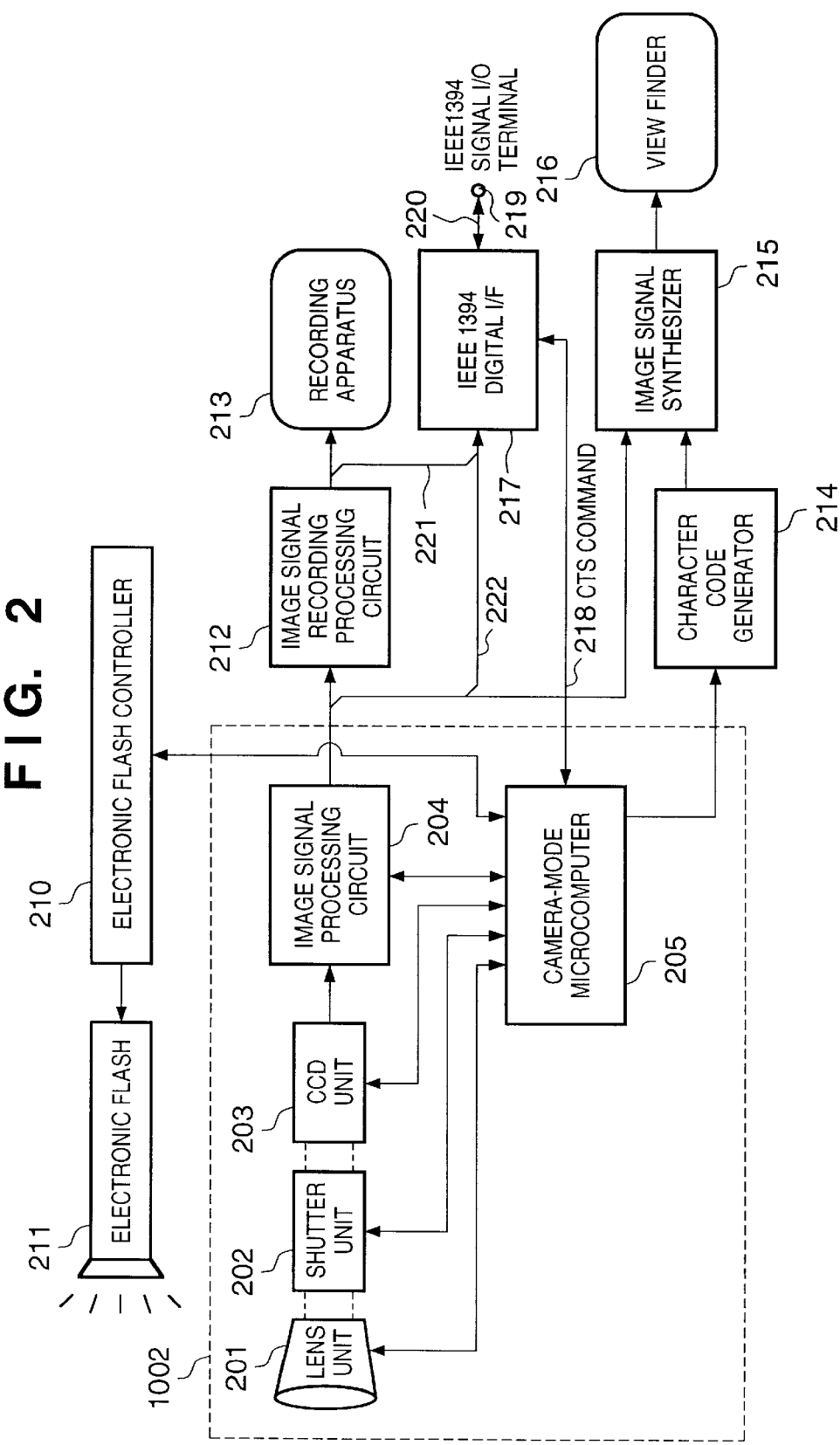
FIG. 2 is a block diagram illustrating an internal configuration of a video camera according to the first embodiment of the present invention.

Referring to FIG. 2, the command signal transmitted via the digital communication line 303, conforming to the IEEE 1394 standard, enters the video camera 301 through an IEEE 1394 signal input/output (I/O) terminal 219, and transferred to an IEEE 1394 digital interface (I/F) 217. The I/F 217 detects a CTS command 218, and the camera-mode microcomputer 205 controls corresponding unit/units, such as a lens unit 201, a shutter unit 202, a CCD unit 203, and an image signal processing circuit 204, in a camera sub-unit 1002 which is an image sensing unit of the video camera 301, in accordance with the detected CTS command 218.

In the camera sub-unit 1002, control commands shown in table 1, status commands shown in table 2, and notify command, shown in table 3, are provided.

TABLE 1

Control Commands

| COMMAND | OPERATION |
|---|---|
| AE MODE | automatic exposure mode |
| CC FILTER | color correction filter |
| DIGITAL ZOOM | electronic zooming |
| FADER | fader |
| FOCAL LENGTH | control of focal length |
| FOCUS | control of movement of focus lens |
| FOCUSING MODE | focusing mode |
| FOCUSING POSITION | control of position of focus lens |
| FRAME | frame in image |
| GAIN | gain |
| GAMMA | gamma |
| IMAGE STABILIZER | stabilize image |
| INFRARED | changeover to processing infrared light |
| IRIS | iris diaphragm |
| KNEE | nee point, nee slope |
| ND FILTER | light reduction filter |
| OUTPUT SIGNAL MODE | output data signal format |
| PAN/TILT/ROLL | control of pan head |
| SCAN MODE | method of reading CCD |
| SHIFT | shift amount and direction of camera movement |
| SHUTTER | shutter speed |
| TILT | tilt amount and direction of camera movement |
| VIDEO LIGHT/STROBE | video light, strobe |
| WHITE BALANCE | white balance |
| ZOOM | zooming |

TABLE 2

Status Commands

| COMMAND | OPERATION |
|---|---|
| AE MODE | automatic exposure mode |
| CC FILTER | color correction filter |
| DIGITAL ZOOM | electronic zooming |
| FADER | fader |
| FOCAL LENGTH | control of focal length |
| FOCUS | control of movement of focus lens |
| FOCUSING MODE | focusing mode |
| FOCUSING POSITION | control of position of focus lens |
| FRAME | frame in image |
| GAIN | gain |
| GAMMA | gamma |
| IMAGE STABILIZER | stabilize image |
| INFRARED | changeover to processing infrared light |
| IRIS | iris diaphragm |
| KNEE | nee point, nee slope |
| ND FILTER | light reduction filter |
| OUTPUT SIGNAL MODE | output data signal format |
| PAN/TILT/ROLL | control of pan head |
| SCAN MODE | method of reading CCD |
| SHIFT | shift amount and direction of camera movement |
| SHUTTER | shutter speed |
| TILT | tilt amount and direction of camera movement |
| VIDEO LIGHT/STROBE | video light, strobe |
| WHITE BALANCE | white balance |
| ZOOM | zooming |
| DISTORTION | information on distortion |
| FADER INFO | preset fader information |
| PEDESTAL | pedestal |

TABLE 2-continued

Status Commands

| COMMAND | OPERATION |
| --- | --- |
| SHADING | shading of marginal lumination |
| WHITE BALANCE INFO | preset white balance information |

TABLE 3

Notify Commands

| COMMAND | OPERATION |
| --- | --- |
| CC FILTER | color correction filter |
| DIGITAL ZOOM | electronic zooming |
| FADER | fader |
| FOCAL LENGTH | control of focal length |
| FOCUS | control of movement of focus lens |
| FOCUSING POSITION | movement of position of focus lens |
| ND FILTER | light reduction filter |
| PAN/TILT/ROLL | information on movement of pan head |
| SHIFT | shift amount and direction of camera movement |
| TILT | tilt amount and direction of camera movement |
| VIDEO LIGHT/STROBE | video light, strobe |
| ZOOM | zooming |

FIGS. 3A, 3B, 4A and 4B shows examples of images displayed on a monitor of the computer 302. On the monitor, an image 501, transmitted from the video camera 301 is displayed, and various control switches 502 to 519 are arranged. The user operates these control switches while watching the image 501 sensed by the video camera 301 on the graphical user interface as shown in FIGS. 3A, 3B, 4A and 4B. In response to the user operation, the application software outputs the corresponding command, thereby it is possible to control the video camera 301 from the computer 302.

Further, the video camera 301 also has a preview finder 216 capable of displaying an image similar to that shown in the monitor of the computer 302.

Sensed image data is transferred to an image signal recording processing circuit 212 where signal processes for recording are applied to the image data, then further transferred to a recording apparatus 213 and recorded on a recording medium.

At the same time, the sensed image data is also transferred to an image signal synthesizer 215. In the image signal synthesizer 215, in order to display an image sensing mode designated by the camera-mode microcomputer 205 on the view finder 216, signs and characters outputted from a character code generator 214 are synthesized with the sensed image data, then sent to the view finder 216 to be displayed.

Next, operations of the camera-mode microcomputer 205 of the camera sub-unit 1002 corresponding to various commands are explained.

First, as for operation statuses of the lens unit 201, the shutter unit 202, the CCD unit 203, and the image signal processing circuit 204, there are a focus length and F value for the lens unit 201, shutter speed for the shutter unit 202, a mode either of the progressive scanning or the interlace scanning for the CCD unit 203 and the image signal processing circuit 204, for instance. The application software on the computer 302 regularly transmits status commands, in turn, the camera-mode microcomputer 205 accesses and checks statuses of the respective units, then transmits response signals to the computer 302. Each transmitted response signal is displayed on the monitor of the computer 302, thereby a user is informed of the statuses of the video camera 301 form the computer 302.

Next, an operation for switching between the progressive scanning and the interlace scanning is explained. First, a status command for inquiring an image sensing mode of the CCD unit 203 ("SCAN MODE" in table 2) is outputted from the computer 302 to the video camera 301 in accordance with the application software. Then, the command signal entered the video camera 301 through the IEEE 1394 signal (I/O) terminal 219 shown in FIGS. 1 and 2 is received as a CTS command 218 in the IEEE 1394 digital I/F 217 and transmitted to the camera-mode microcomputer 205 of the camera sub-unit 1002.

In response to the status command, the camera-mode microcomputer 205 checks the status of the image sensing method currently set in the CCD unit 203 and the image signal processing circuit 204, and transmits a signal, as a response command, indicating either the progressive scanning or the interlace scanning from the IEEE 1394 digital I/F 217 to the computer 302 as a controller.

Figure 3B:
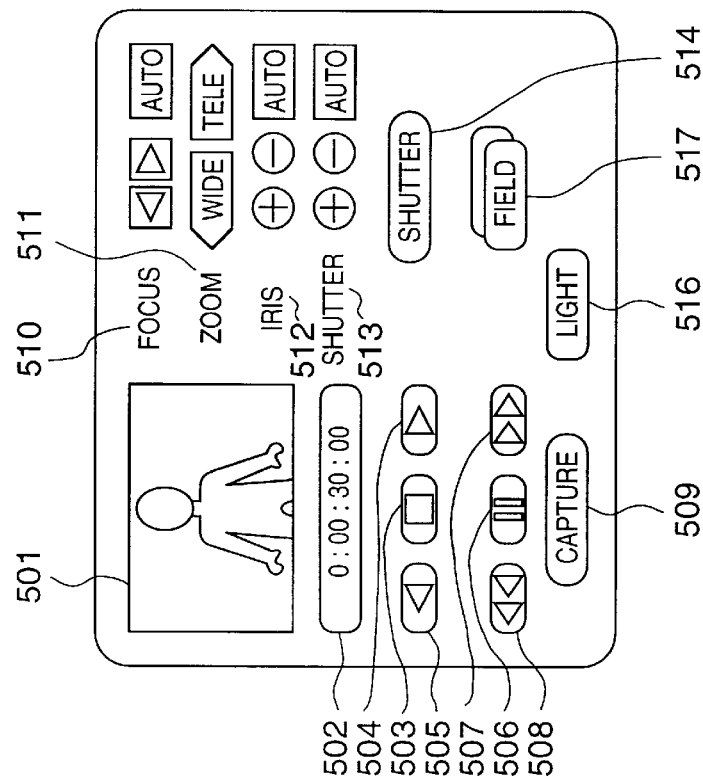
FIGS. 3A and 3B are views showing examples of displayed contents on a monitor of a computer.
Figure 3A:
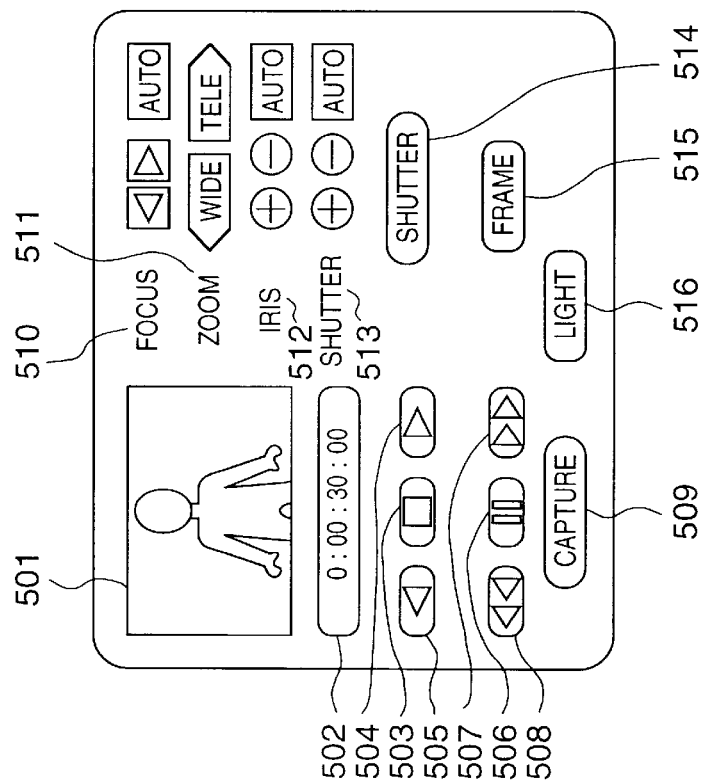
Figure 4A:
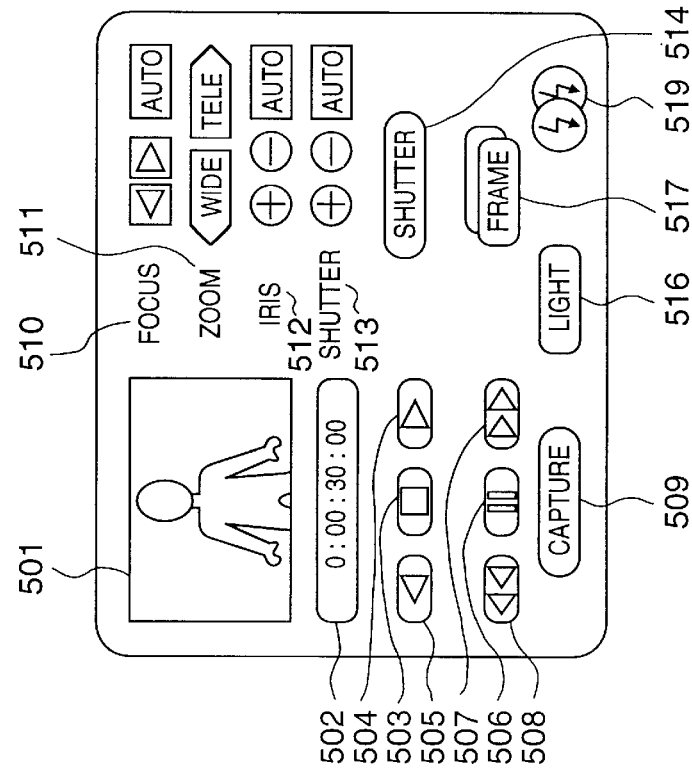
FIGS. 4A and 4B are views showing examples of displayed contents on the monitor of the computer.
Figure 4B:
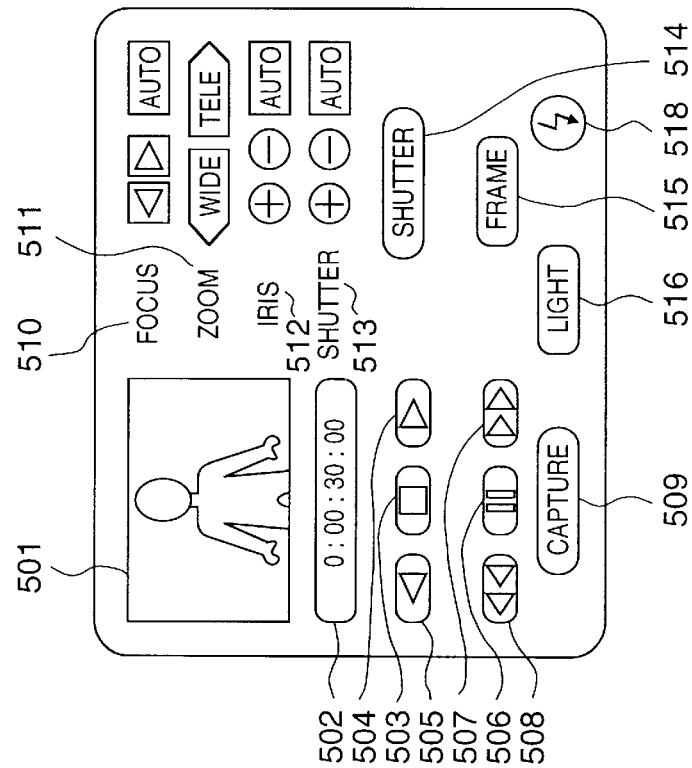

Examples of images, showing the status of the camera sub-unit 1002, displayed on the monitor of the computer 302 are shown in FIGS. 3A, 3B, 4A and 4B. Note, FIGS. 3A and 3B show a case where no flash operation is to be performed, and FIGS. 4A and 4B show a case where flash operation is to be performed (518 and 519). A box 515 in FIGS. 3A and 4A indicates that the progressive scanning image sensing mode is set, and a box 517 in FIGS. 3B and 4B indicates that the interlace scanning image sensing image sensing mode is set.

With regard to other statuses of focus, zoom, and exposure control, for instance, the computer 302 regularly transmits status commands to inquire the statuses, similarly to inquiring the status of the image sensing mode as described above, then displays responses on the monitor. Accordingly, the user is always informed of the statuses of the video camera 301 on the monitor of the computer 302.

Furthermore, for switching image sensing modes of the camera sub-unit 1002 and controlling the focus, zoom, and exposure, the user clicks corresponding switches displayed on the monitor using a mouse pointer, in turn, the application software outputs corresponding control commands.

For example, when switching the image sensing mode of scanning method from the progressive scanning to the interlace scanning, the user clicks the box 515 in FIG. 3A or 4B displayed on the monitor; in turn, the application software transmits a control command "SCAN MODE", shown in table 1. The video camera 301 receives this command via the IEEE 1394 digital I/F 217 through the IEEE 1392 signal I/O terminal 219, shown in FIG. 2, and the I/F 217 transfers the command as a CTS command 218 to the camera-mode microcomputer 205 in the camera sub-unit 1002. Then, the camera-mode microcomputer 205 switches the image sensing method set in the CCD unit 203 and the image signal processing circuit 204 from the progressive scanning to the interlace scanning. After the change-over is completed, the video camera 301 transmits a response to the computer 302.

Then, in response to the response signal, corresponding to the status command from the computer 302, transmitted right after the scanning method is switched, an image displayed on the monitor of the computer 302 is updated from the box 515 as shown in FIGS. 3A and 4A to the box 517 as shown in FIGS. 3B and 4B.

For sensing an image, the user clicks a shutter button 514 on the monitor shown in FIGS. 3A, 3B, 4A or 4B, thereby a command designating to initiate an image sensing operation is transmitted from the computer 302. In turn, the camera-mode microcomputer 205 operates the respective units of the camera sub-unit 1002 to sense a still image of a frame.

The sensed television signals are transferred from the image signal processing circuit 204 to the IEEE 1394 digital I/F 217, and outputted to the computer 302 from the IEEE 1394 signal I/O terminal 219. At this time, when transmitting a base-band signal to the computer 302 without processing it, a path 222 is used, whereas, when transmitting the base-band signal after processing it into a signal of the same format as that of the signal recorded in the recording apparatus 213 by performing, e.g., DV compression, a path 221 via the image signal recording processing circuit 212 is used.

Next, operation of an electronic flash 211, which is a main concern of the first embodiment of the present invention, is explained. First, when it is designated to adjust brightness using the electronic flash by the user by clicking the button 516 in FIG. 3A or 3B shown on the monitor, or automatically designated as an operation result of the automatic exposure mode ("AE MODE" in table 2) on the basis of the shutter speed ("SHUTTER" in table 2) and the iris diaphragm ("IRIS" in table 2), for example, the application software on the computer 302 transmits a control command for turning on the electronic flash ("VIDEO LIGHT/STROBE" in table 1).

When the camera-mode microcomputer 205 receives the command via the IEEE 1394 signal I/O terminal 219 and the IEEE digital I/F 217, it controls the electronic flash controller 210 to charge the electronic flash 211 so as to be ready for flashing. At this time, in response to a response signal from the camera-mode microcomputer 205 corresponding to the status command "VIDEO LIGHT/STROBE" (table 2) transmitted from the computer 302, an image including a button 518 as shown in FIG. 4A is displayed on the monitor of the computer 302 when the progressive scanning method is selected, whereas an image including buttons 519 as shown in FIG. 4B is displayed when the interlace scanning method is selected.

Further, when the response signal corresponding to the status command indicates "charging" and the video camera 301 is not ready for sensing an image, the buttons 518 and 519 may be blinked to notify the user of the "charging" status. Further, in this situation, a notify command "VIDEO LIGHT/STROBE" in table 3 may be used instead of the status command. Specifically, the computer 302 transmits the notify command "VIDEO LIGHT/STROBE" to the video camera 301; in turn, the camera-mode microcomputer 205 of the video camera 301 transmits a response to the notify command "VIDEO LIGHT/STROBE" to the computer 302 when charging of the electronic flash 211 is completed and the video camera 301 is ready for sensing an image. In this case, the button 516 or 517 is blinked until the response is received by the computer 302.

Then, in image sensing operation, when the shutter button 514, shown in FIGS. 4A and 4B, on the monitor is clicked, a command designating an image sensing operation is transmitted from the computer 302; in turn, the camera-mode microcomputer 205 sends a signal indicating which scanning method is set for the image sensing operation to the electronic flash controller 210. In response to the signal, the electronic flash controller 210 controls the electronic flash 211 to flash once per a frame when the progressive scanning is set as the image sensing mode as shown in FIG. 5, whereas, to flash twice per two fields, once for each field, when the interlace scanning is set as the image sensing mode as shown in FIG. 7.

Figure 8A:
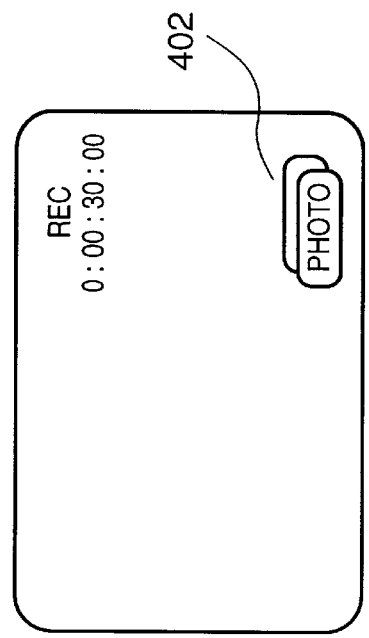
FIGS. 8A to 8D are views showing examples of displayed contents on a view finder of the video camera.
Figure 8B:
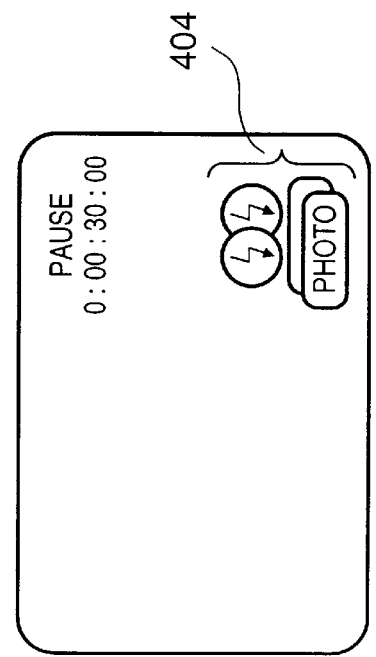

As for an image displayed on the view finder 216 of the video camera 301, the camera-mode microcomputer 205 transmits a signal corresponding to a status of the set scanning method to the character code generator 214, so that the character code generator 214 generates a sign as shown by a reference numeral 401 in FIG. 8A when the progressive scanning is set, and generates a sign as shown by a reference numeral 402 in FIG. 8B when the interlace scanning is set, and the generated sign is displayed on the view finder 216.

Figure 8C:
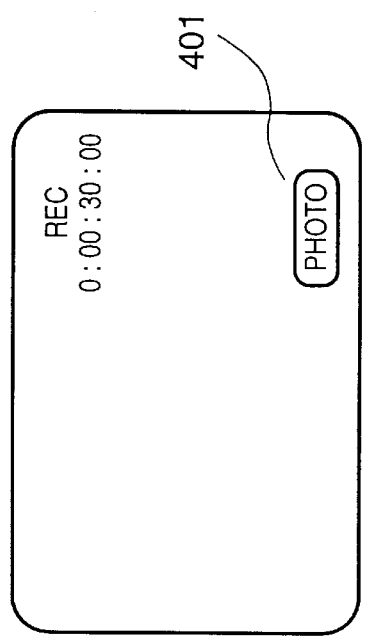
Figure 8D:
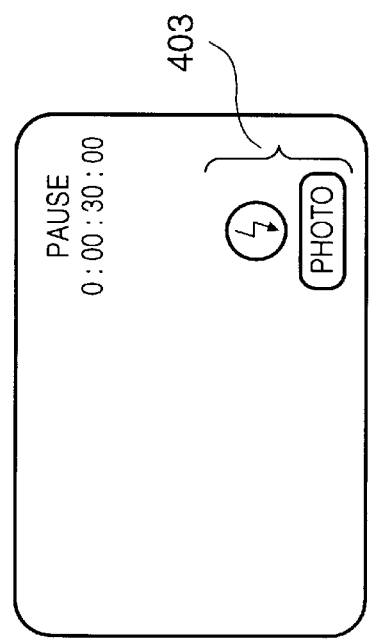

Further, when a signal indicating to use the electronic flash 211 is received, the camera-mode microcomputer 205 controls the character code generator 214 so as to generate a sign as shown by a reference numeral 403 in FIG. 8C when the progressive scanning is set, and a sign as shown by a reference numeral 404 in FIG. 8D when the interlace scanning is set, and the generated sign is displayed on the view finder 216.

Further, when the electronic flash 211 is being charged for preparing to flash, this state is notified to the user by blinking the signs 403 and 404 shown in FIGS. 8C and 8D. Accordingly, operability of the video camera is improved.

According to the first embodiment as described above, flash operation of an electronic flash is controlled in accordance with the scanning method set in an image sensing apparatus; therefore, it is possible to stabilize illumination effect of the electronic flash regardless of the scanning method, thereby obtaining an image of good quality.

More specifically, in progressive scanning, the electronic flash is turned on once for each frame period, whereas, in interlace scanning, the electronic flash is turned on once for each field period; therefore, it is possible to prevent an image from being mismatched, in the interlace scanning, which is a conventional problem caused by synthesizing a field image sensed with flashing the electronic flash and a field image sensed without flashing the electronic flash into a frame image.

Further, by interchanging signals between an image sensing apparatus, such as the video camera, and an external device, such as a computer, it is possible to select and control an image sensing method and designate whether or not to use an electronic flash from the external device.

<Modification of the First Embodiment>

Next, a modification of the first embodiment will be explained.

In the first embodiment, the present invention is applied to a system comprising an image sensing apparatus and a control apparatus, in which the image sensing apparatus is remote-controlled by the control apparatus. In the modification of the first embodiment, the present invention is applied to an independent image sensing apparatus.

FIG. 9 is a block diagram illustrating a video camera, as an image sensing apparatus, in which the number of flash operation of an electronic flash is controlled depending upon the status of a switch switching between the progressive scanning and the interlace scanning.

In FIG. 9, reference numeral 1001 denotes a camera sub-unit. In the camera sub-unit 1001, various operations for sensing an object are performed using a camera-mode microcomputer 105 as described below.

Controls for focusing and zooming are performed in such a manner that, in response to an operation of a switch or a dial (not shown) on the video camera, a signal for controlling the focusing or zooming is inputted via an image sensing designation signal input terminal 108, and further transmitted to the camera-mode microcomputer 105 via a camera sub-unit control signal input circuit 106; in turn, the camera-mode microcomputer 105 controls the focusing or zooming of a lens unit 101.

Operation of the shutter and control of the shutter speed are also performed in the same manner. Namely, a signal from the shutter button (not shown), generated in response to a pushing operation of the shutter button by a user for sensing an image, is transferred to the camera-mode microcomputer 105 via the image sensing designation signal input terminal 108 and the camera sub-unit control signal input circuit 106. In turn, the camera-mode microcomputer 105 controls brightness of an image formed on a CCD unit 103 by operating a shutter unit 102 at a designated shutter speed. Note, a mechanism of an iris diaphragm is not shown.

Further, whether to scan image data in the progressive scanning or in the interlace scanning is selected by a switch 107, and a signal from the switch 107 is transmitted to the camera-mode microcomputer 105 via the camera sub-unit control signal input circuit 106.

The camera-mode microcomputer 105 controls the CCD unit 103 and an image signal processing circuit 104 in response to the switch signal, thereby television image signal is acquired in either the progressive or interlace scanning method.

The acquired image data is transmitted to an image signal recording processing circuit 112, where signal processes for recording are performed on the image data. Thereafter, the image data is transmitted to a recording apparatus 113 and recorded on a recording medium.

At the same time, the captured image data is also transmitted to an image signal synthesizer 115. In the image signal synthesizer 115, for displaying image sensing mode designated by the camera mode microcomputer 105, signs and characters outputted from a character code generator 114 are synthesized with the sensed image data and transmitted to a view finder 116, where the synthesized image is displayed.

Next, a method of flashing an electronic flash 111, which is a main concern of the modification of the first embodiment, is explained. When the switch 107 for switching between scanning methods is operated, a signal indicating the selected scanning method is transmitted to the camera-mode microcomputer 105 via the camera sub-unit control signal input circuit 106. In response to the signal, the camera-mode microcomputer 105 transmits a signal indicating to flash the electronic flash 111 once for a frame or twice for a frame, once for each field, to an electronic flash controller 110.

If an image is sensed in the progressive scanning, the camera-mode microcomputer 105 transmits a signal for instructing to flash the electronic flash 111 to the electronic flash controller 110 so that the electronic flash 111 flashes at timing shown in FIG. 5, synchronizing with the exposing of the CCD unit 103.

Whereas, if an image is sensed in the interlace scanning, the camera-mode microcomputer 105 transmits a signal for instructing to flash the electronic flash 111 to the electronic flash controller 110 so that the electronic flash 111 flashes at timing shown in FIG. 7, synchronizing with the exposing of the CCD unit 103.

Furthermore, the camera-mode microcomputer 105 transmits a signal corresponding to a status of the switch 107 to the character code generator 114, so that the character code generator 114 generates the sign (icon) as shown by a reference numeral 401 in FIG. 8A when the progressive scanning is set, and generates the sign as shown by a reference numeral 402 in FIG. 8B when the interlace scanning is set, and the generated sign is displayed on a view finder 116.

Further, when a signal indicating to use the electronic flash 111 is received from the image sensing designation signal input terminal 108, the camera-mode microcomputer 105 controls the character code generator 114 so as to generate the sign as shown by a reference numeral 403 in FIG. 8C when the progressive scanning is set, and the sign as shown by a reference numeral 404 in FIG. 8D when the interlace scanning is set, and the generated sign is displayed on the view finder 116.

Further, when the electronic flash 111 is being charged for preparing to flash, this state is notified to the user by blinking the signs 403 and 404 shown in FIGS. 8C and 8D. Accordingly, operability of the video camera is improved.

According to the modification of the first embodiment, the effects as those obtained in the first embodiment are also achieved with an individual image sensing apparatus.

<Second Embodiment>

Figure 10:
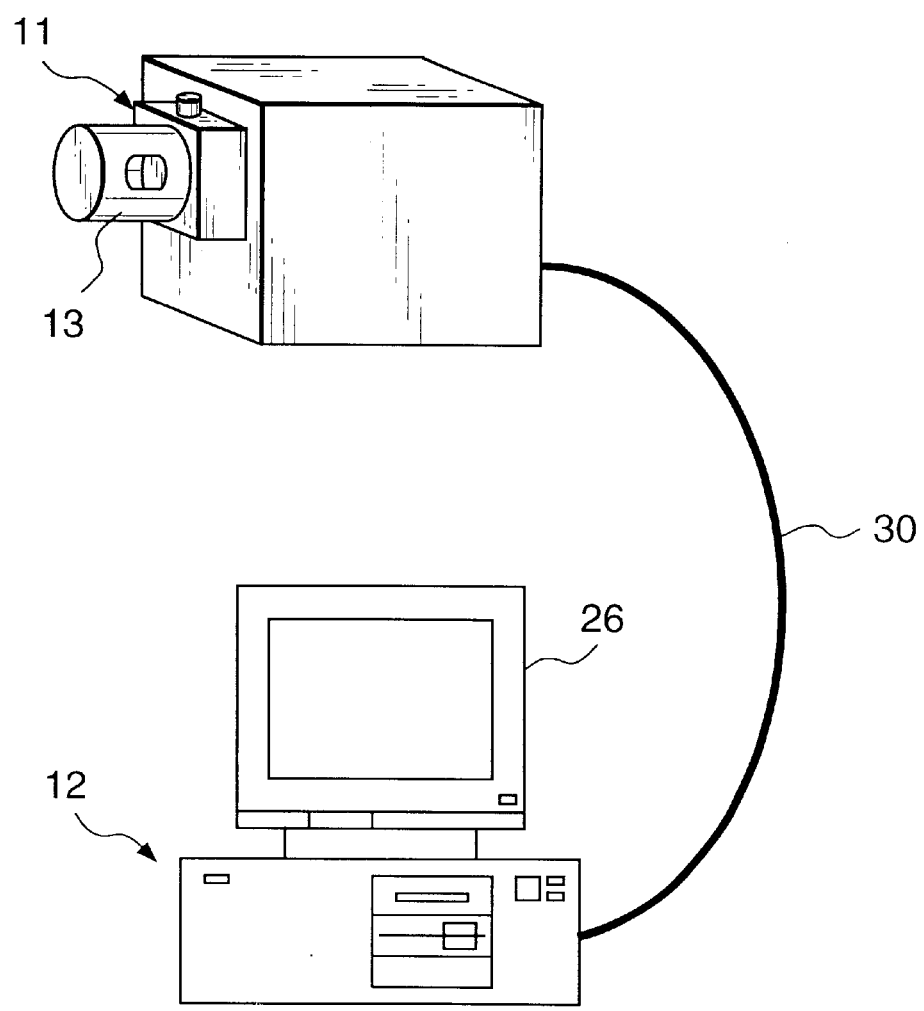
FIG. 10 is a diagram illustrating an overall configuration of an image sensing system according to a second embodiment of the present invention.

FIG. 10 shows an overall configuration of an image sensing system according to the second embodiment of the present invention. In FIG. 10, reference numeral 11 denotes a video camera, whose image sensing lens 13 is configured movable for camera movements (shift, tilt, and so on).

Reference numeral 12 denotes a personal computer which is connected to the video camera 11 via a cable 30 conforming to the IEEE 1394 standard. The video camera 11 and the personal computer 12 perform image information communication. The personal computer 12 functions as a controller for the video camera 11. An image sensed by the video camera 11 is transferred via the IEEE 1394 cable 30 and displayed on a display 26 of the personal computer 12.

The image sensing lens 13 of the video camera 11 is moved in accordance with a control command from the personal computer 12, and the video camera 11 senses an image with an effect of the camera movements. The video camera 11 transmits the amount of movement of the lens 13 to the personal computer 12 via the cable 30.

Next, lens movements for sensing an image with camera movement effect are explained with reference to FIGS. 11 and 12.

Figure 11:
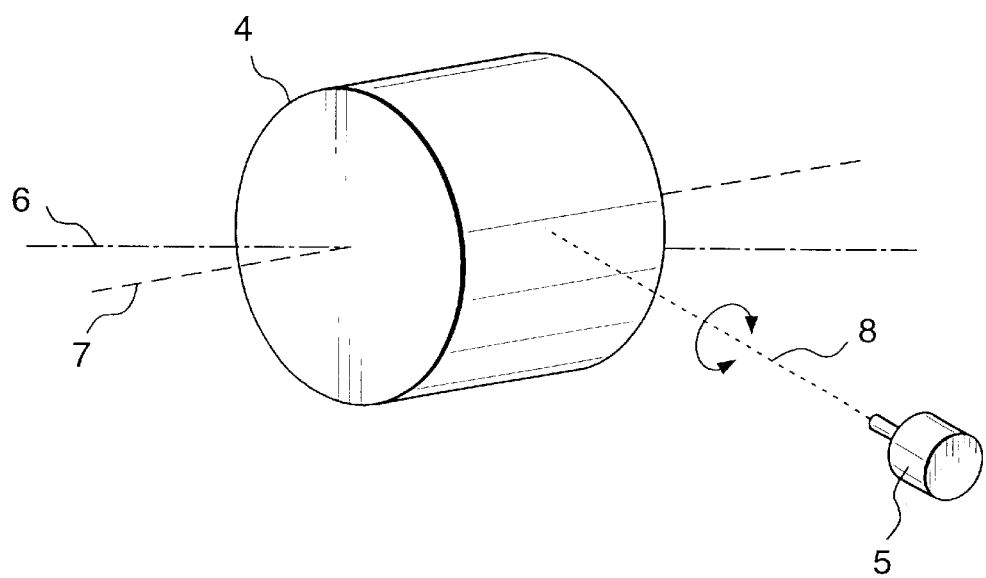
FIG. 11 is an explanatory view showing a lens movement of tilt.

FIG. 11 shows a lens movement of tilt. In a normal image sensing operation, an optical axis 7 of a lens unit 4 is on a center line 6. The lens unit 4 is tilted about a horizontal axis 8, which is orthogonal to the optical axis 7, by an actuator 5, such as a motor. Accordingly, the optical axis 7 and the center line 6 make an angle, and, when an image is sensed under this condition, an image with a tilt-effect is acquired. Regarding swing, by tilting the lens unit 4 about a vertical axis which is orthogonal to both the optical axis 7 and the horizontal axis 8, a swing-effect is realized.

Figure 12:
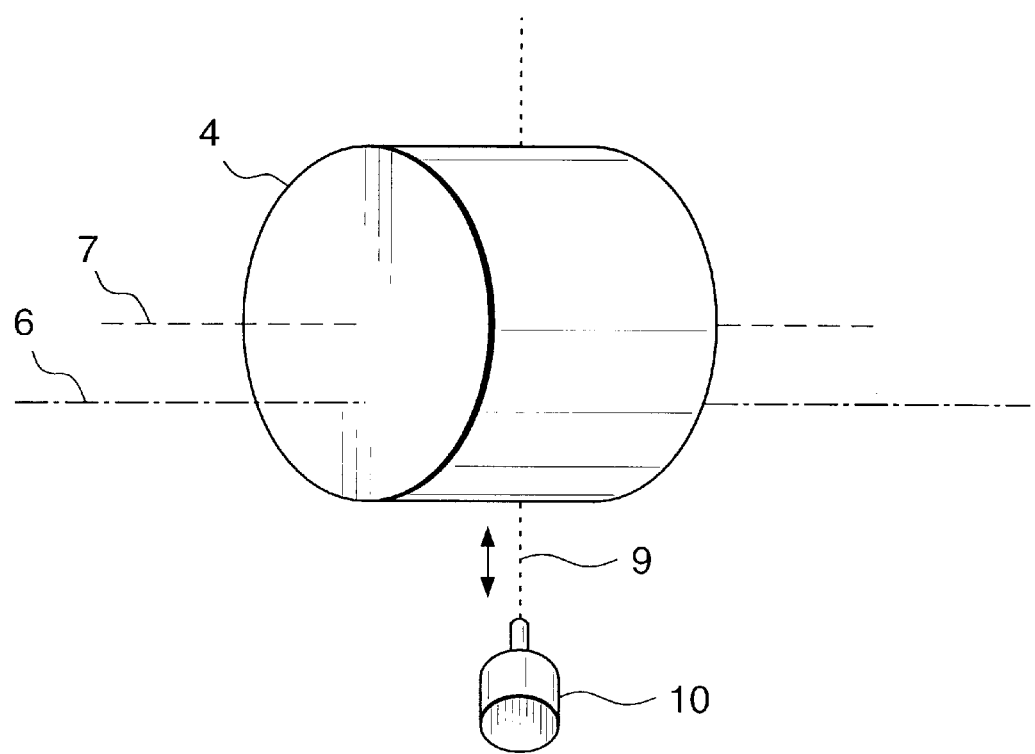
FIG. 12 is an explanatory view showing a lens translation of rise/fall.

FIG. 12 is an explanatory view showing a lens translation by a rise/fall. The optical axis 7 of the lens unit 4 is usually on the center line 6. In rise/fall operation, the lens unit 4 is translated in orthogonal to the optical axis 7 (i.e., along a vertical axis 9 which is perpendicular to the optical axis 7)

by an actuator 10, such as a motor. Accordingly, the optical axis 7 is separated from the center line 6 at a distance, and, when an image is sensed under this condition, an image with a rise- or fall-effect is acquired. Regarding shift, by translating the lens unit 4 along a horizontal axis which is orthogonal to both the optical axis and the vertical axis 9, a shift-effect is realized.

Next, a signal flow in the image sensing system according to the second embodiment is explained in detail with reference to FIG. 13.

Figure 13:
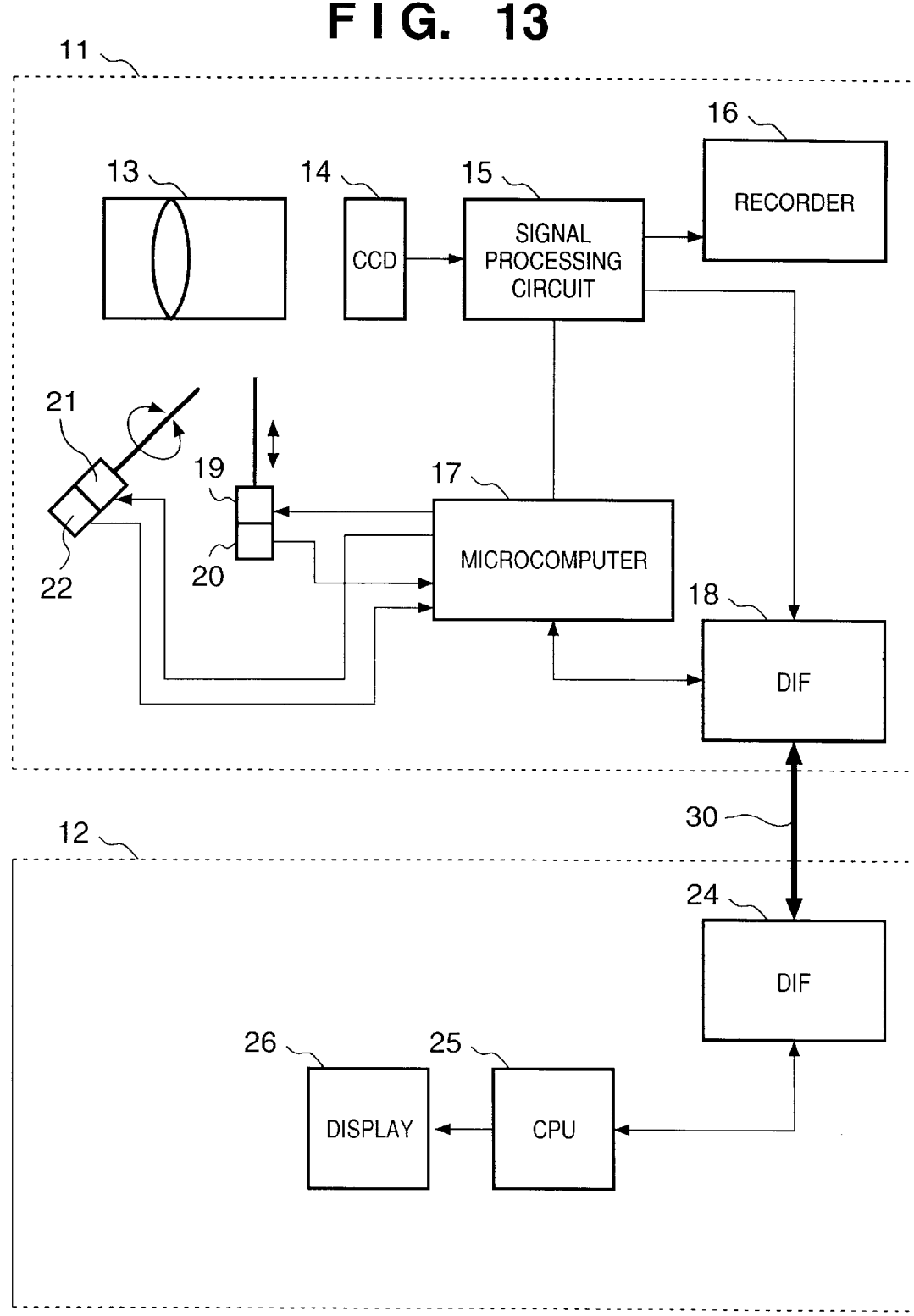
FIG. 13 is a block diagram illustrating a configuration of an image sensing system according to the second embodiment of the present invention.

Referring to FIG. 13, reference numeral 11 denotes the video camera, which is an image sensing apparatus of the image sensing system. In the video camera 11, an optical image passed through the image sensing lens 13 is converted into electric signals by an image sensing device (e.g., CCD) 14.

Then the electric signals are processed by a signal processing circuit 15, thereafter, recorded by a recorder 16, and/or transferred to a digital interface (DIF) 18. Reference numeral 17 denotes a microcomputer for controlling the respective internal units of the video camera 11. It is to be noted that the microcomputer 17 is not for controlling the overall operation of the image sensing system.

To the image sensing lens 13, actuators for camera movements are provided, and these actuators are controlled in accordance with an instruction from the microcomputer 17.

Further, it is configured so that the amounts of movements of the actuators are known by the microcomputer 17. In FIG. 13, reference numeral 19 denotes an actuator for the rise/fall of the lens, and the actuator 19 is mainly configured with a motor, for instance. The actuator 19 moves the image sensing lens 13 in the vertical direction orthogonal to the optical axis 7. Further, reference numeral 20 denotes an encoder for acquiring an amount of movement of the lens 13, and the encoder 20 transmits a value corresponding to the amount of the movement to the microcomputer 17.

Reference numeral 21 denotes an actuator for the tilt of the lens. The actuator 21 is mainly configured with a motor, for example, and rotates the image sensing lens 13 about a horizontal axis which is orthogonal to the optical axis 7. Reference numeral 22 denotes an encoder for acquiring an amount of movement of the lens 13, and the encoder 22 transmits a value corresponding to the amount of the tilt to the microcomputer 17. Note, mechanisms for the shift and swing are not shown in FIG. 13, however, mechanisms for the shift and swing which are similar to those as described above may be provided.

In the second embodiment, the amount of movement of the lens 13 is acquired using the encoders 20 and/or 22, however, it is possible for the microcomputer 17 to designate the amount of movement without using an encoder.

The signal processing circuit 15 generates image signals, such as luminance signals and color signals, on the basis of signals transmitted from the CCD 14, as well as determines the defocused degree of an image and detects the focus position.

The microcomputer 17 controls the lens to move in the direction of the optical axis 7 for detecting focus. From the amount of the lens movement, the result of focus detection by the signal processing circuit 15, and the focal length of the used lens (in a case of using a zoom lens, the focal length changes depending upon a zooming ratio), the distance to an object is determined.

It should be noted that the focus detection, performed by the signal processing circuit 15, may be repeatedly performed for a plurality of portions in an image, thus, it is possible to determine distances to a plurality of objects in the image. Further, the microcomputer 17 can transmit information, such as the distances to the objects, the focal length of the lens, and an angle of view, to the personal computer 12 via the DIF 18.

The DIF 18 conforms to the IEEE 1394 standard, and transmits image information from the signal processing circuit 15 and various information from the microcomputer 17 to the personal computer 12 via an IEEE 1394 cable 30. At this time, according to the IEEE 1394 standard, the image information is transmitted in isochronous communication and the various information from the microcomputer 17 is transmitted in asynchronous communication. When transmitting the various information from the microcomputer 17 in asynchronous communication, the information is transmitted in a format and method defined by the AVC protocol.

The personal computer 12 which functions as a controller in the image sensing system in the second embodiment comprises a digital interface (DIF) 24, a CPU 25, and the display 26.

The CPU 25 is a main unit for realizing the operation functions and the control functions of the personal computer 12, and has wider functions, i.e., used for other functions. The CPU 25 receives image information and the various information from the video camera 11 via the DIF 24, as well as transmits the amount of lens movement to be used in camera movements to the video camera 11.

The display 26 displays image information received from the video camera 11 and various information from the CPU 25.

The DIF 24 also conforms to the IEEE 1394 standard, similarly to the DIF 18 in the video camera 11.

The CPU 25 is used to predict how an image will be affected by the camera movements on the basis of information, such as the focal length, the angle of view, and the distance to an object, transmitted from the video camera 11. When an image is sensed with camera movement of, e.g., rise/fall, the appearance of an object changes. The CPU 25 predicts the amount of the change and displays the change on the display 26.

Figure 14:
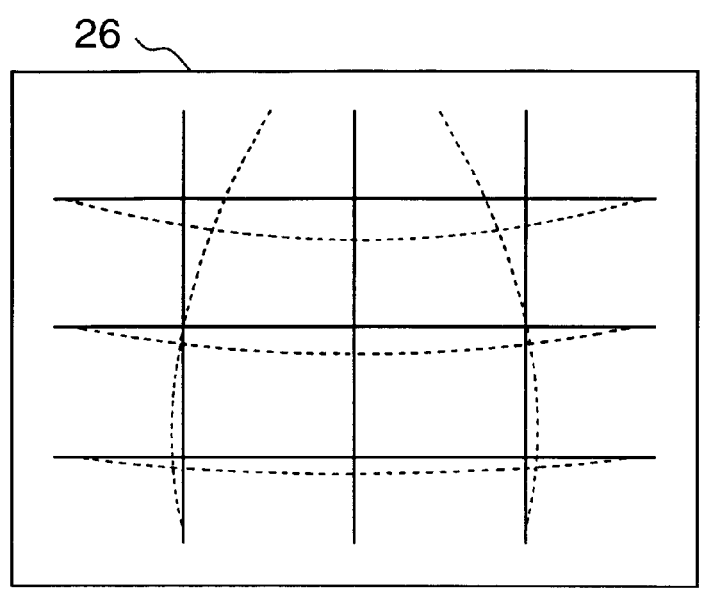
FIG. 14 is a diagram showing an effect of camera movements displayed on a display screen.

In displaying the predicted change, an original shape may be expressed by solid lines and the predicted amount may be expressed by dot lines as shown in FIG. 14, for instance. Alternatively, it is also possible to convert image information from the video camera 11 so as to reflect the effect of the camera movements, and display the converted image. In both cases, a sign or signs (e.g., an arrow or arrows) indicating the horizontal and/or vertical direction of a displayed image may be displayed on the display 26 so that the user can use the direction information for determining the amount of camera movements.

When the amount of camera movements is determined on the basis of the displayed information, the amount of lens movement for camera movements is transmitted from the CPU 25 to the video camera 11. In turn, the microcomputer 17 controls to move the image sensing lens 13 of the video camera 11, thereby an image is sensed with camera movements. The amount of the lens movement for camera movements is transmitted from the DIF 18 to the DIF 24 in a method conforming to the AVC protocol, similarly to the other various information transmitted from the video camera 11.

Figure 15:
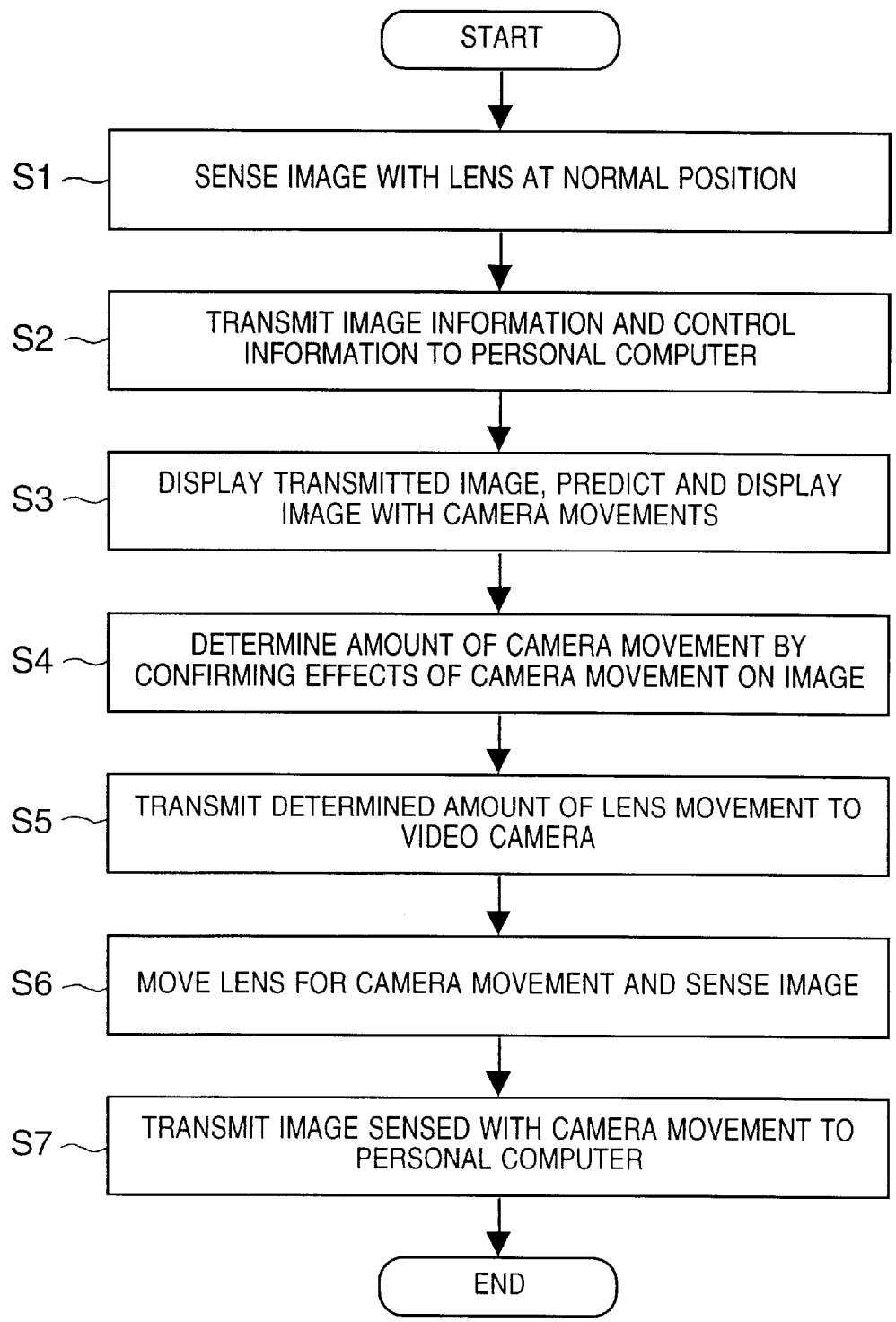
FIG. 15 is a flowchart for explaining a sequence of image sensing operation according to the second embodiment of the present invention.

Next, a sequence of image sensing operation with camera movements is explained with reference to FIG. 15.

First, in step S1, an image is sensed with the lens 13 being at a normal position (without camera movements). In this process, on the basis of the focus positions of the lens 13, information on distances to objects in the image is obtained.

Next, in step S2, image information of the sensed image and control information, such as the distances to objects and an angle of view, are transmitted to the personal computer 12 via the DIFs 18 and 24.

Then, in step S3, the personal computer 12 displays the transmitted image on the display 26, as well as predicts and displays an image affected by the camera movements on the basis of the various control information.

Thereafter, in step S4, the user determines the proper amount of camera movements by confirming effects of the camera movements based on the image displayed on the display 26 of the computer 12. After the proper amount of camera movements is determined, then the process proceeds to step S5 where the amount of movement of the lens 13 is transmitted to the video camera 11 via the DIFs 24 and 18.

Then, in step S6, the lens 13 of the video camera 11 is moved to add effects of camera movements on the basis of the transmitted amount of movement of the lens 13, then image sensing operation is performed under the set conditions.

Next, in step S7, a sensed image with camera movement effects is transmitted to the personal computer 12 via the DIFs 18 and 24. Accordingly, the user can confirm the result of the camera movements. If the desired image is obtained as a result of the image sensing operation with camera movements, then the image sensing operation is completed.

According to the second embodiment as described above, by providing a control unit for moving an image sensing lens unit in an image sensing apparatus and controlling the control unit from an external control apparatus to perform image sensing operation with camera movements, as well as transmitting the amount of movement of the image sensing lens unit from the image sensing apparatus to the control apparatus, it is possible for the control apparatus to control the image sensing operation in the image sensing apparatus to perform camera movements and generate image information of the image sensed with the camera movements.

Further, since communication units conforming to the IEEE 1394 standard, capable of transmitting data and commands via a common signal line, are used for communicating information between the image sensing apparatus and the control apparatus, and control is performed using commands conforming to the AVC protocol, it is possible to configure an image sensing system capable of effectively performing image sensing operation with camera movements.

Furthermore, the amount of movement of the image sensing lens unit of the image sensing apparatus can be confirmed by the displaying on the control apparatus.

Further, since a change in an image due to the translation and/or inclination of the image sensing lens unit is predicted on the basis of information, such as the distance to an object, the angle of view, and the focal length of the lens unit, the predicted change in image is displayed on a display device.

Further, since necessary commands can be dealt with as commands conforming to the conventional AVC protocol, it is possible to easily design an image sensing apparatus and a control apparatus.

<Third Embodiment>

Next, the third embodiment of the present invention will be explained.

Figure 24:
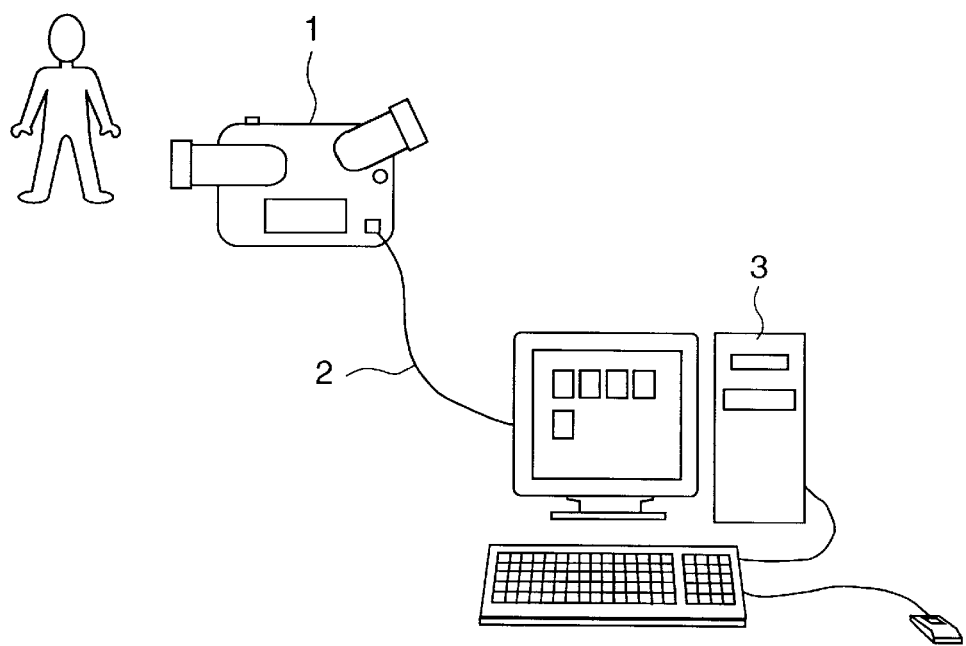
FIG. 24 is a view showing a configuration of a remote-control image sensing system.
Figure 25:
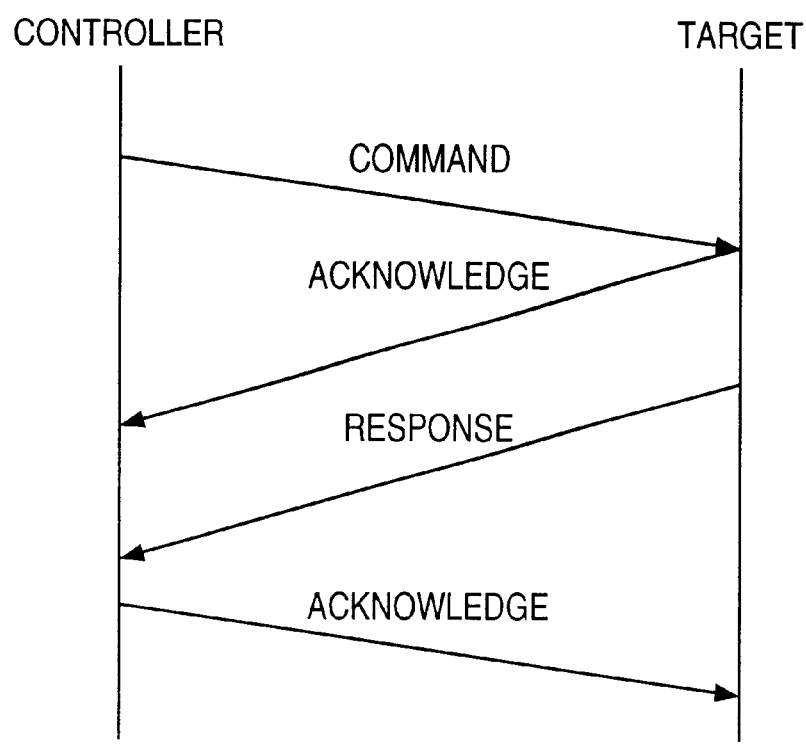
FIG. 25 is a conceptual view showing communication in accordance with CTS.

An image sensing system according to the third embodiment apparently has the same configuration as that of the conventional system explained with reference to FIG. 24. Namely, as shown in FIG. 24, by connecting the digital video camera 1 and the personal computer 3 via digital interface terminals (not shown) through the cable 2 conforming to the IEEE 1394 standard, a user can control zooming and focusing of the digital video camera 1 while watching an image, as shown in FIG. 16 in the third embodiment, sensed by the digital video camera 1 and displayed on a display screen of the personal computer 3, and control to capture a desired image in the personal computer 3.

Figure 16:
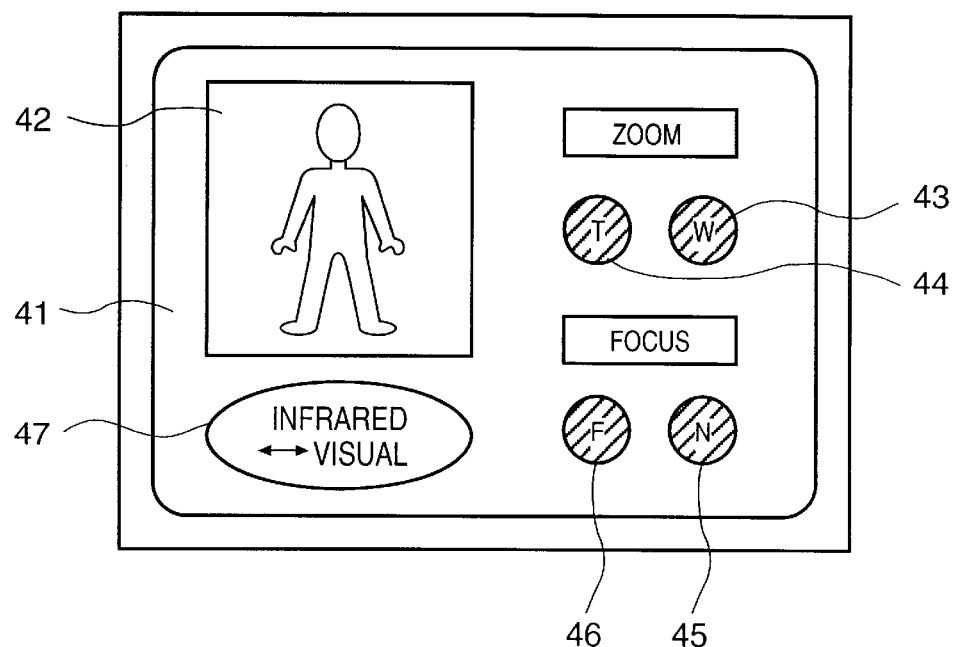
FIG. 16 is a view showing a control image displayed on a personal computer according to a third embodiment of the present invention.

Referring to FIG. 16, reference numeral 41 denotes a monitor of the personal computer 3; 42, a preview window for displaying an image transmitted from the digital video camera 1; 43, a wide-button for moving a zoom lens to a wide angle side; 44, a tele-button for moving the zoom lens to a telephoto side; 45, a near-button for moving the focus to the closer side; 46, a far-button for moving the focus to the farther side; and 47, switch button for switching between a function of converting visual light into image signals and a function for converting infrared light into image signals, by a toggle switch.

When one of these buttons 43 to 47 is pressed (or clicked using a cursor), a corresponding control command, out of the commands listed in the table 1, described in the first embodiment, for a camera sub-unit is outputted from the personal computer 3 to the digital video camera 1.

For example, when the zoom button 43 or 44 is pressed, "telephoto" or "wide" is designated and transmitted as an operand of the ZOOM command which is listed in table 1. Further, the personal computer 3 transmits a status command as shown in table 2, which is also explained in the first embodiment, and acquire a current state of the digital video camera 1 from a response to the status command.

Referring to table 2, when a status command "ZOOM" is sent, for instance, the video camera 1 puts the zooming position information into an operand, and sends the information back to the personal computer as a response. Further, notify commands, as shown in the table 3 which is also described in the first embodiment, for requesting a target (in this case, the video camera 1) to report a change in the status when the status of the target is changed to a designated state are also prepared.

Referring to table 3, a notify command "ZOOM" with "zoom position" as an operand is transferred, the video camera 1 responses to the personal computer 3 when the lens has been moved to the designated zoom position.

Next, switch over operation between the function of converting visual light into image signals and the function of converting infrared light into image signals when the switch button 47 is pressed is explained.

Figure 17:
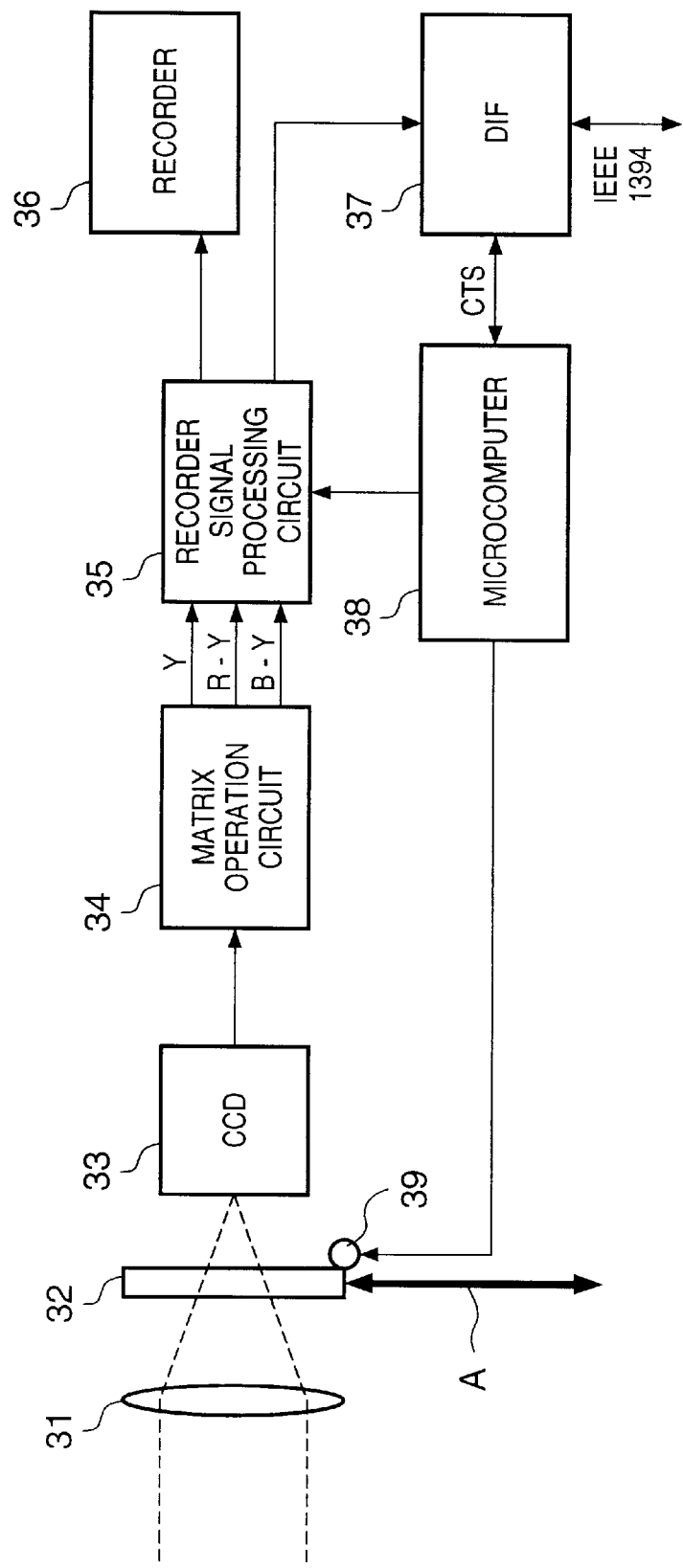
FIG. 17 is a block diagram illustrating a configuration of an image sensing apparatus according to the third embodiment of the present invention.
Figure 26:
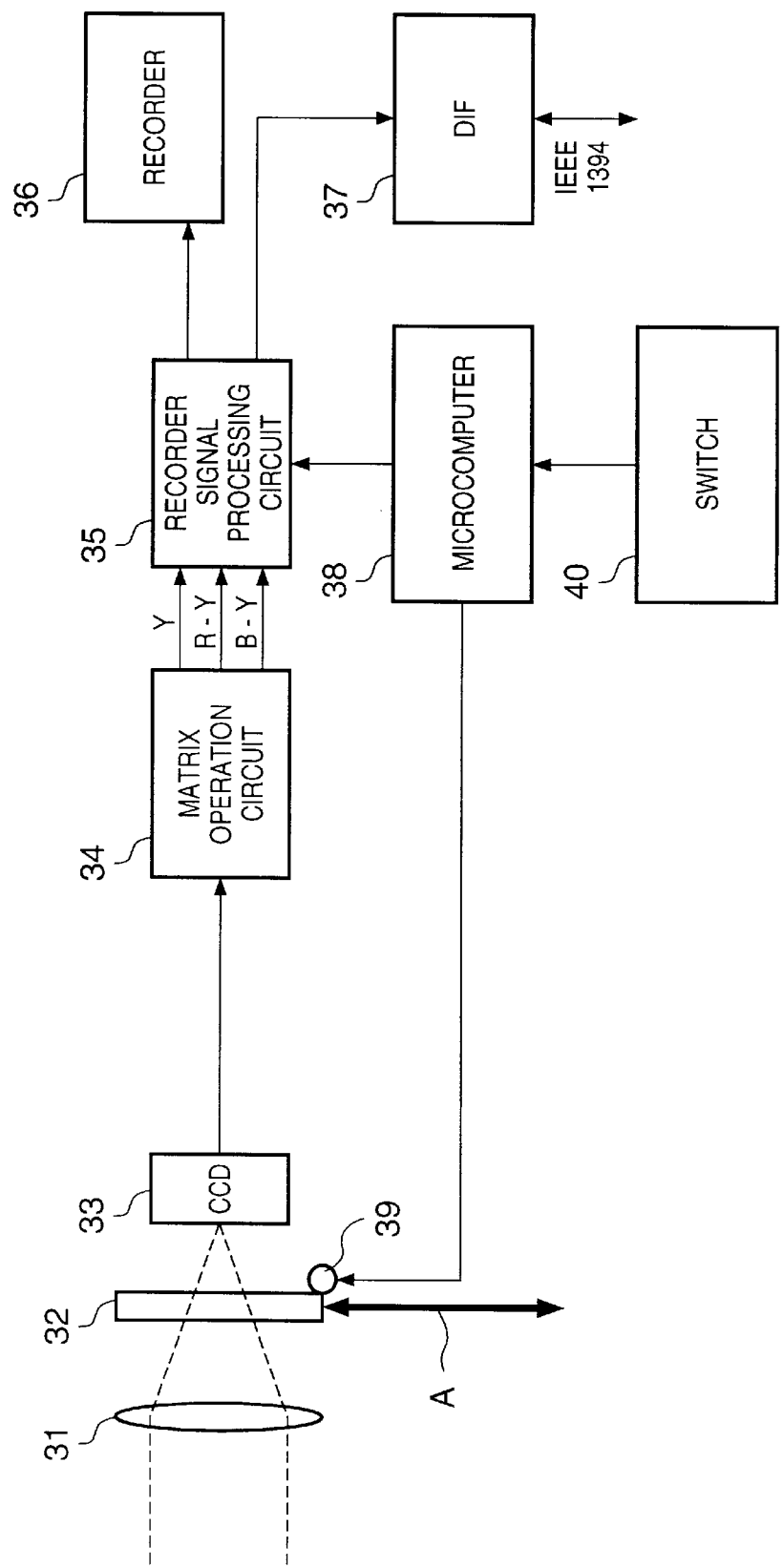
FIG. 26 is a block diagram illustrating a conventional image sensing apparatus in which functions for processing visual light and infrared light are switched.

FIG. 17 is a block diagram illustrating a configuration of the digital video camera 1 according to the third embodiment. In FIG. 17, the units and elements as those explained with reference to FIG. 26 are referred to by the same reference numerals. Reference numeral 31 denotes a lens; 32, an infrared filter; 33, a CCD; 34, a matrix operation circuit; 35, a recorder signal processing circuit; 36, a recorder; 37, a digital interface (DIF); 38, a microcomputer; and 39, an actuator.

First, in a case of converting visual light into image signals, light passing through the lens 31 is filtered by the infrared filter 32 and the filtered visual light forms an image on the CCD 33. The CCD 33 converts the formed optical image into electric signals, and transmits the signals to the matrix operation circuit 34.

A complementary color filter is formed on the CCD 33 so that each color of the complementary color filter covers each pixels of the CCD, and light of different colors passed through the color filter are incidence on the respective pixels, thereby image signals of different color components are generated.

The electric signals are inputted to the matrix operation circuit 34, from which a luminance signal Y, and color difference signals R-Y and B-Y are outputted.

The luminance signal Y and the color difference signals R-Y and B-Y are inputted to the recorder signal processing circuit 35. The recorder signal processing circuit 35 converts the inputted image signals (i.e., the luminance signal Y and the color difference signals R-Y and B-Y) into signals of digital video format and provides the converted signals to the recorder 36 together with status data indicating, e.g., infrared/visual light mode. In the recorder 36, the signals are recorded on a recording medium. At the same time, the signals of the digital video format are also outputted from the DIF 37.

Next, in a case of converting infrared light into image signals, when an operand indicating to switch to infrared operation mode is sent along with the control command "INFRARED" for switching between infrared/visual light operation modes to DIF 37, DIF 37 transmits the corresponding CTS to the microcomputer 38.

In turn, the microcomputer 38 controls the actuator 39 so that the infrared filter 32 is removed out of a light path to the CCD 33 (moved in the direction shown in an arrow A in FIG. 17). Accordingly, light including infrared light incidents on the CCD 33 and converted into electric signals, then transmitted to the matrix operation circuit 34.

Next, the recorder signal processing circuit 35 is controlled so as to change the color difference signals R-Y and B-Y to express achromatic state, because a color component of infrared light is not visible. The subsequent processes are the same as those for processing image signals of visual light.

In the control command "INFRARED", an operand for toggle operation is also prepared, and the operand causes switching from one operation mode (i.e., either the infrared operation mode or visual light operation mode) to the other depending upon the current mode. The personal computer 3 can be made aware of which switching operation the video camera 1 is performing using the status command.

Further, an operand for forcibly setting the function of converting visual light and an operand for forcibly setting the function of converting infrared light are also available. By using these operands, it is possible to set the desired function regardless of the status of the digital video camera 1.

Further, since a sensed image due to visual light is displayed in the preview window 42 of the personal computer 3 as shown in FIG. 16, when the image is sensed under a dark condition, a user can notice the condition because the displayed image is dark and vague. In this case, by pressing the switch button 47, an operation as described above is performed, and an infrared image is displayed in the preview window 42.

Then, if the strength of the infrared light is strong enough and the displayed infrared image is brighter than the normal image which was displayed previously, the infrared image may be kept displayed, whereas, if the displayed infrared image is dark due to the lack of infrared light, it is possible to switch back to a visual light image obtained by converting visual light by pressing the switch button 47 again.

According to the third embodiment as described above, in a system configured by connecting an image sensing apparatus, having the function of converting visual light into image signals and the function of converting infrared light into image signals, to a control apparatus capable of controlling the image sensing apparatus via a communication line through which image signals and commands are interchanged, a control command for switching between the above two functions and a status command for inquiring which function is currently selected are transmitted from the control apparatus to the image sensing apparatus, and the two functions are switched as designated by the control command. Therefore, it is possible to change the function of converting visual light and the function of converting infrared light in the image sensing apparatus from the control apparatus, which makes it unnecessary to operate a switch provided in the image sensing apparatus.

Further, when an image displayed on the control apparatus is dark, a user can designate to send a command for changing the functions from the control apparatus to select the function of converting infrared light; therefore a remote control image sensing system capable of more clearly sensing a dark image is realized.

<Fourth Embodiment>

In the third embodiment, the functions of converting visual light and infrared light are switched when a user determines that the image sensing condition is dark. By contrast, in the fourth embodiment, a case where the functions are automatically switched so as to sense an image in the optimized condition is explained.

Figure 18:
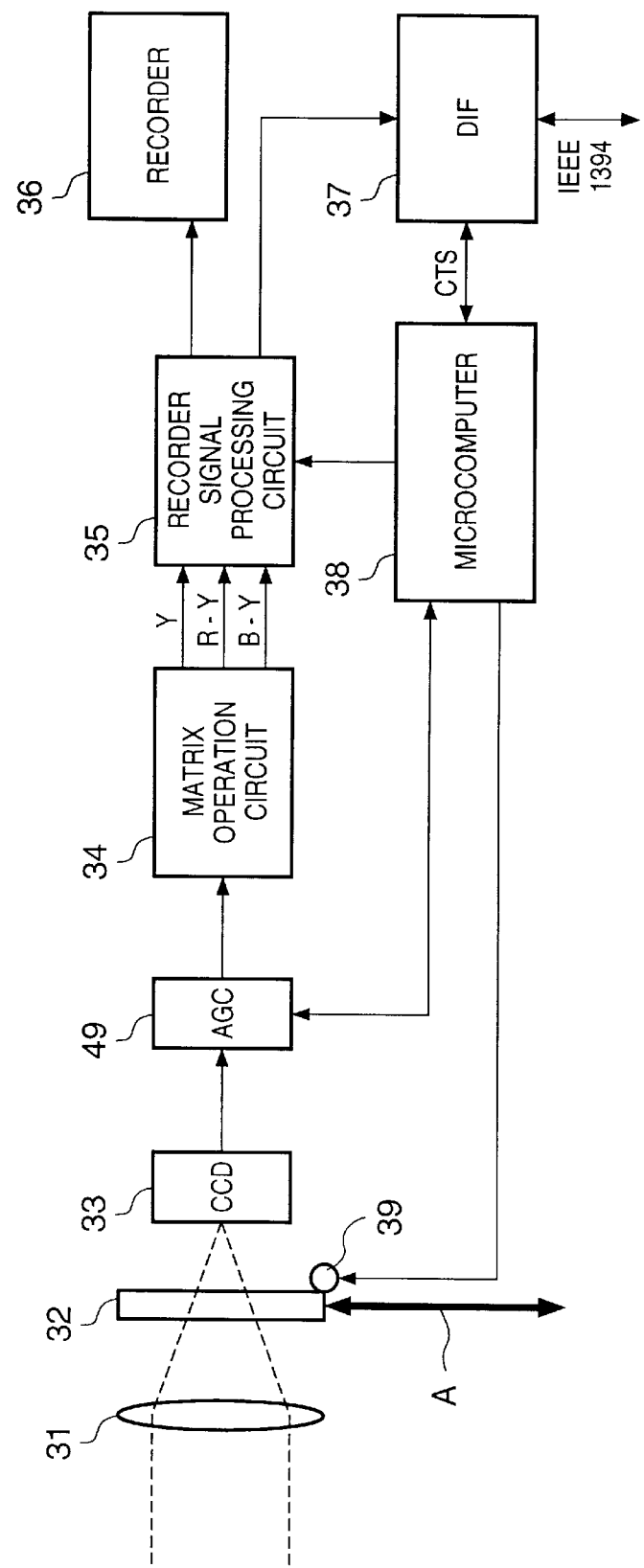
FIG. 18 is a block diagram illustrating a configuration of an image sensing apparatus according to a fourth embodiment of the present invention.

FIG. 18 is a block diagram illustrating a configuration of the digital video camera 1 according to the fourth embodiment. In FIG. 18, the units and elements as those explained with reference to FIG. 26 are referred to by the same reference numerals. Reference numeral 31 denotes a lens; 32, an infrared filter; 33, a CCD; 34, a matrix operation circuit; 35, a recorder signal processing circuit; 36, a recorder; 37, a digital interface (DIF); 38, a microcomputer; 39, an actuator; and 49, an automatic gain controller (AGC).

First, in a case of converting visual light into image signals, light passing through the lens 31 is filtered by the infrared filter 32 and the filtered visual light forms an image on the CCD 33. The CCD 33 converts the formed optical image into electric signals, and transmits the signals to the AGC 49.

The AGC 49 controls to increase the gain when an input signal level is low, whereas, when an input signal level is high, the AGC 49 passes the input signal to the matrix operation circuit 34. A complementary color filter is formed on the CCD 33 so that each color of the complementary color filter covers each pixels of the CCD, and light of different colors passed through the color filter are incidence on the respective pixels. The signals of the respective pixels are operated in the matrix operation circuit 34, from which a luminance signal Y, and color difference signals R-Y and B-Y are outputted.

The recorder signal processing circuit 35 converts the inputted image signals (i.e., the luminance signal Y and the color difference signals R-Y and B-Y) into signals of digital video format and provides the converted signals to the recorder 36 where the signals are recorded on a recording medium. At the same time, the signals of the digital video format are also outputted onto a communication line from the DIF 37.

The personal computer 3 regularly transmits the status command for inquiring the status of the AGC 49 (GAIN in the table 2) to the digital video camera 1 while displaying a transmitted image in the preview window 42 (FIG. 16).

In the digital video camera 1, DIF 37 sends a CTS, corresponding to the received status command, to the microcomputer 38. The microcomputer 38 is always aware of the status of the AGC 49, and it transmits the status of the AGC 49 to the personal computer 3 as a response to the CTS.

When the gain used in the AGC 49 is greater than a first predetermined value, the personal computer 3 determines that the digital video camera 1 is currently sensing a dark image, and separate the sensed image into luminance signals and color signals, then stores those signals in memory. Further, the personal computer 3 sends a command INFRARED for controlling to change visual/infrared light operation modes to the digital video camera 1.

When the control command INFRARED is transmitted to the DIF 37, the DIF transmits a corresponding DTS to the microcomputer 38. In turn, the microcomputer 38 controls the actuator 39 so that the infrared filter 32 is removed out of a light path to the CCD 33 (moved in the direction shown in an arrow A in FIG. 18). Accordingly, light including infrared light incidents on the CCD 33 and converted into image signals, then transmitted to the matrix operation circuit 34 via the AGC 49.

Next, the recorder signal processing circuit 35 is controlled so as to change the color difference signals R-Y and B-Y to express achromatic state, because a color component of infrared light is not visible. The subsequent processes are the same as those for processing image signals of visual light.

Under this condition, the personal computer 3 regularly transmits a status command for inquiring the state of the AGC 49, and compares the gain used in the AGC 49, which is transmitted as a response to the status command, to a second predetermined value. When the gain is large, then the personal computer 3 determines that the infrared light is not strong enough, then transmits the command "INFRARED" to control the video camera 1 to convert visual light.

Whereas, when the gain is smaller than the second predetermined value, since the infrared light is strong, an infrared image, which is currently sensed, is synthesized with luminance signals of an image of visual light which has been stored in the memory, and an image is outputted in the preview window 42 on the basis of the synthesized luminance signals and the color signals which have been stored in the memory. This processing sequence of the personal computer 3 is explained below with reference to FIG. 19.

Figure 19:
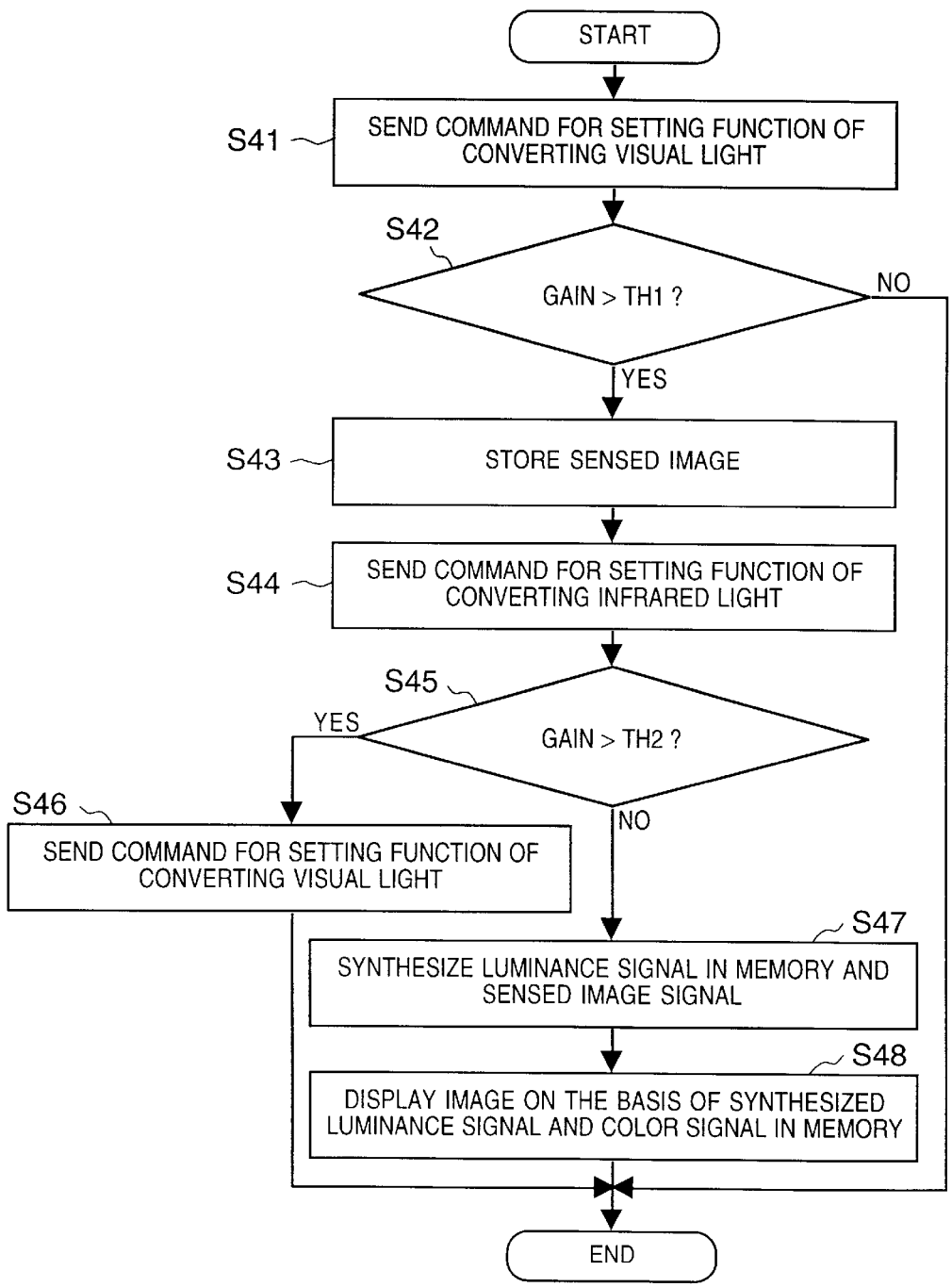
FIG. 19 is a flowchart of a control operation by a control apparatus according to the fourth embodiment of he present invention.

Referring to FIG. 19, when the processing starts, a command for setting the function of converting visual light is transmitted in step S41.

Thereafter, in step S42, whether or not the gain is greater than a first predetermined value TH1 is determined. If no, then the process is completed.

Whereas, if it is determined in step S42 that the gain is greater than the first predetermined value TH1, then the process proceeds to step S43 where a sensed image is stored in memory. After storing the image, the process proceeds to step S44, where a command for switching to the function of converting infrared light into image signals is transmitted.

Next in step S45, whether or not a gain is greater than a second predetermined value TH2 is checked. If yes, the process proceeds to step S46 where a command for switching to the function of converting visual light into image signals is outputted.

Whereas, if it is determined in step S45 that the gain is equal to or less than the second predetermined value TH2, the process proceeds to step S47 where the image signals (luminance signals) stored in the memory in step S43 and image signals which are currently sensed are synthesized. Thereafter, in step S48, the synthesized image signals are displayed in the preview window 42 (FIG. 16). Thus, an image is expressed on the basis of the synthesized luminance signals and color signals stored in the memory.

Note, the aforesaid synthesizing process is effective to display a still image, such as a landscape and a still life; however, when sensing a moving object, there would be a considerable difference between an image being currently sensed and an image stored in the memory unless the speed for switching from the function of converting visual light to the function of converting infrared light is very fast. Accordingly, a process, such as detecting movement, for allowing or forbidding the synthesizing process may be added.

Further, it is also possible to alternately perform image sensing operation in the visual light operation mode and in the infrared light operation mode in synchronization with sampling timing whose rate is higher than the conventional sampling rate of, e.g., 1/60 second in the NTSC method, and always perform the aforesaid synthesizing. In this case, it is easier to use a rotation-type disk filter having a plurality of filters of the two kinds alternately to establish the synchronization instead of sliding out/in a filter from/in a light path to the CCD.

According to the fourth embodiment as described above, in a system configured by connecting an image sensing apparatus, having the function of converting visual light into image signals and the function of converting infrared light into image signals, to a control apparatus capable of controlling the image sensing apparatus via a communication line through which image signals and commands are interchanged, a control command for switching between the above two functions and a status command for inquiring which function is currently selected are transmitted from the control apparatus to the image sensing apparatus, and the two functions are automatically switched as designated by the control command. Therefore, it is possible to change the function of converting visual light and the function of converting infrared light in the image sensing apparatus from the control apparatus, which makes it unnecessary to operate a switch provided in the image sensing apparatus.

Further, when the strength of visual light is weak, an image generated from visual light and an image generated from infrared light are synthesized, it is possible to provide a remote control image sensing system capable of more clearly displaying both outlines and colors of a dark image.

<Fifth Embodiment>

Next, contents to be displayed when the personal computer 3, as the controller, is connected to the digital video camera 1, as the target, and transmits a command is explained with reference to FIGS. 20 and 21.

Figure 20:
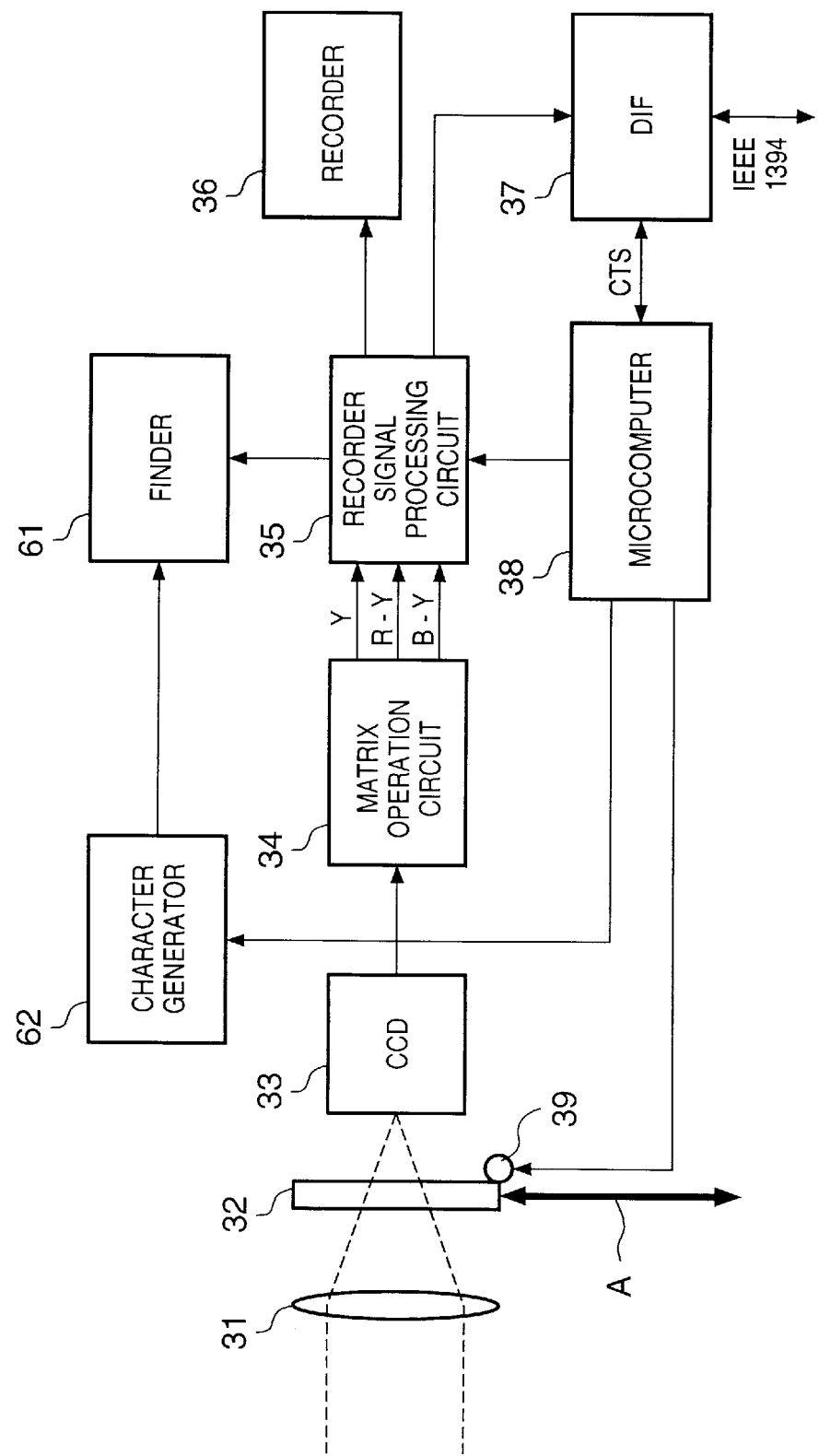
FIG. 20 is a block diagram illustrating a configuration of an image sensing apparatus according to a fifth embodiment of the present invention.
Figure 21:
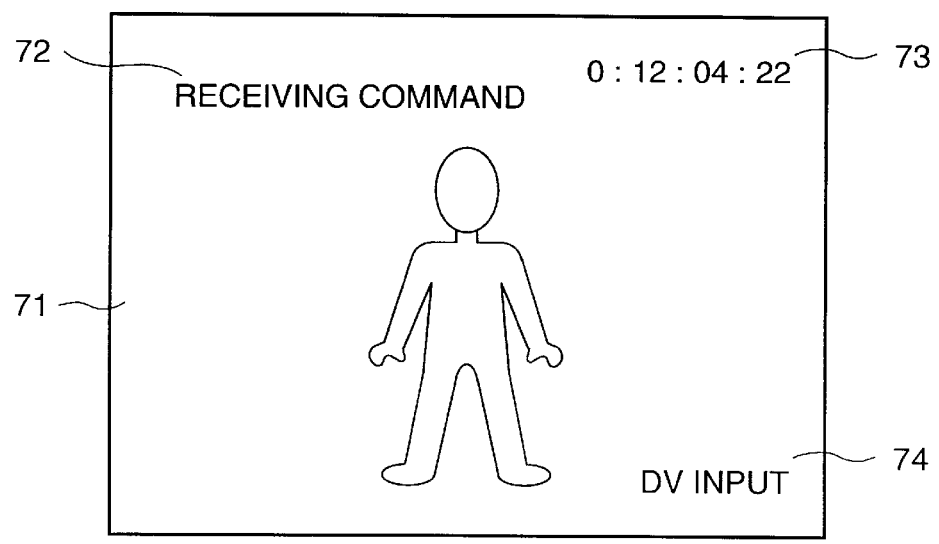
FIG. 21 shows an image displayed on a finder according to the fifth embodiment of the present invention.

FIG. 20 is a block diagram illustrating a configuration of the digital video camera 1 according to the fifth embodiment. In FIG. 20, the units and elements as those explained with reference to FIG. 26 are referred to by the same reference numerals. Reference numeral 31 denotes a lens; 32, an infrared filter; 33, a CCD; 34, a matrix operation circuit; 35, a recorder signal processing circuit; 36, a recorder; 37, a digital interface (DIF); 38, a microcomputer; 39, an actuator; 61, a finder; and 62, a character generator. Further, in FIG. 21, reference numeral 71 denotes a sensed image displayed on the finder 61, and 72 to 74, information displayed over the image.

First, in a case of converting visual light into image signals, light passing through the lens 31 is filtered by the infrared filter 32 and the filtered visual light forms an image on the CCD 33. The CCD 33 converts the formed optical image into electric signals, and transmits the signals to the matrix operation circuit 34.

A complementary color filter is formed on the CCD 33, and light of different colors passed through the color filter are incidence on the respective pixels. The signals of the respective pixels are operated in the matrix operation circuit 34, from which a luminance signal Y, and color difference signals R-Y and B-Y are outputted. The recorder signal processing circuit 35 converts the inputted image signals (i.e., the luminance signal Y and the color difference signals R-Y and B-Y) into signals of digital video format and provides the converted signals to the recorder 36 where the signals are recorded on a recording medium. At the same time, the signals of the digital video format are also outputted to a communication line from the DIF 37.

At the same time, an image is also sent to the finder 61 so that the user can confirm the sensed image. The finder 61 includes a built-in mixing circuit, and information 73 and 74 generated by the character generator 62 is mixed with the sensed image 71 in the finder 61. The information 73 and 74 are generated by the character generator 62 under the control of the microcomputer 38.

Next, in a case of converting infrared light into image signals, when an operand indicating to switch to infrared operation mode is sent along with the control command "INFRARED" for switching between infrared/visual light operation modes to the DIF 37, the DIF 37 transmits the corresponding CTS to the microcomputer 38. In turn, the microcomputer 38 controls the actuator 39 so that the infrared filter 32 is removed out of a light path to the CCD 33 (moved in the direction shown in an arrow A in FIG. 20). Accordingly, light including infrared light incidents on the CCD 33 and converted into electric signals, then transmitted to the matrix operation circuit 34.

Next, the recorder signal processing circuit 35 is controlled so as to change the color difference signals R-Y and B-Y to express achromatic state, because a color component of infrared light is not visible. The subsequent processes are the same as those for processing image signals of visual light.

At the same time, the microcomputer 38 controls the character generator 62 to generate information 72 for notifying the user of the digital video camera 1 being controlled by CTS. The information 72 generated by the character generator 62 is mixed to the image signals in the finder along with the other information 73 and 74, also generated by the character generator 62, and displayed.

According to the fifth embodiment as described above, in addition to the effects of the third embodiment, it is possible for the user to be aware that the image sensing apparatus is currently controlled via a communication line, in the image sensing apparatus, since a display for displaying that the image sensing apparatus has received a command is provided on the image sensing apparatus.

<Sixth Embodiment>

Next, the sixth embodiment will be explained.

When the personal computer 3, as the controller, is connected to the digital video camera 1, as the target, and transmits commands, the preview window 42 is provided in the personal computer 3 as shown in FIG. 16 and the user watches the preview window 42 rather than a finder of the digital video camera recorder 1.

Thus, a case of turning off the finder of the digital video camera 1 is explained with reference to FIG. 22.

Figure 22:
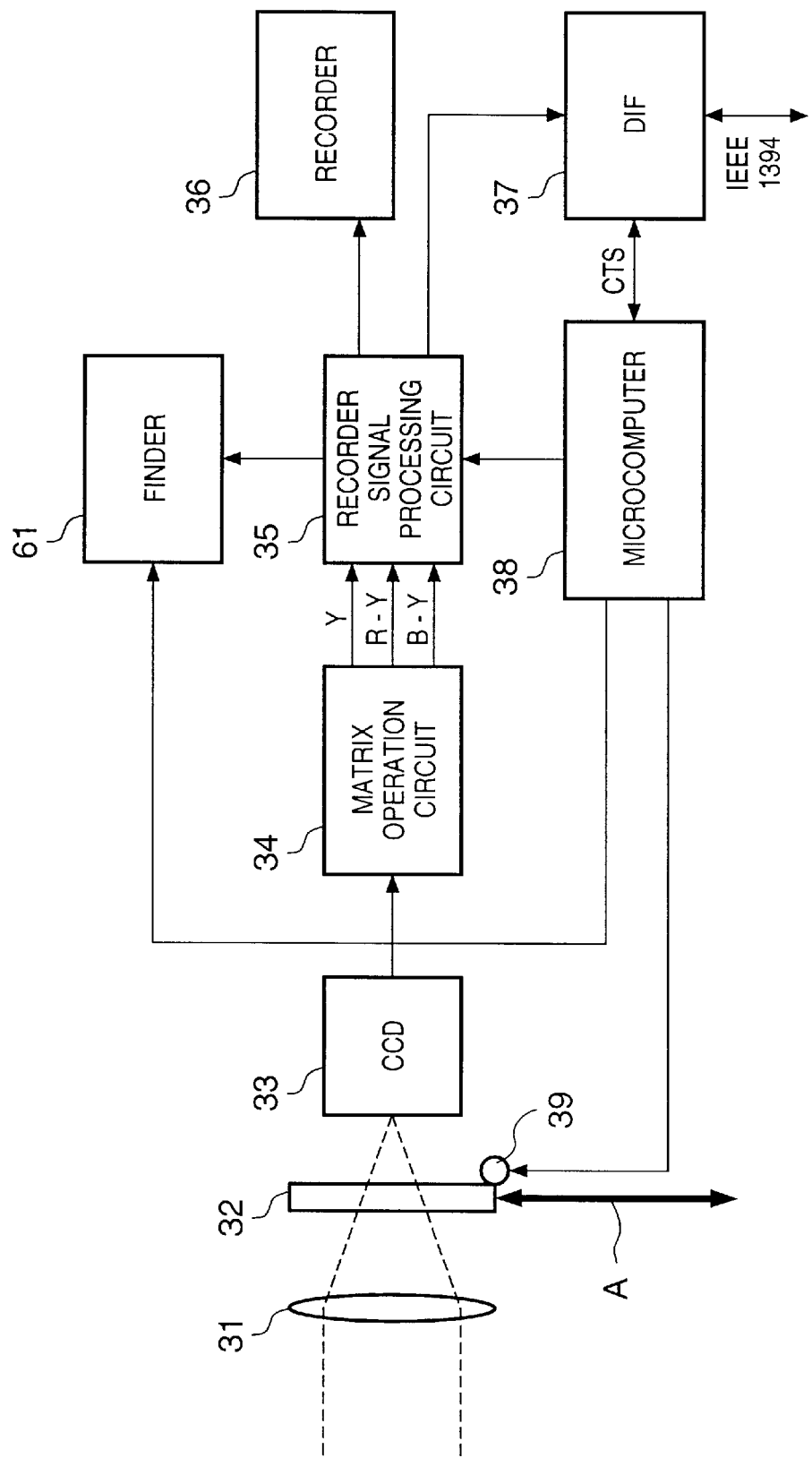
FIG. 22 is a block diagram illustrating a configuration of an image sensing apparatus according to a sixth embodiment of the present invention.

FIG. 22 is a block diagram illustrating a configuration of the digital video camera 1 according to the sixth embodiment. In FIG. 22, the units and elements as those explained with reference to FIG. 20 are referred to by the same reference numerals. Reference numeral 31 denotes a lens; 32, an infrared filter; 33, a CCD; 34, a matrix operation circuit; 35, a recorder signal processing circuit; 36, a recorder; 37, a digital interface (DIF); 38, a microcomputer; 39, an actuator; and 61 a finder.

First, in a case of converting visual light into image signals, light passing through the lens 31 is filtered by the infrared filter 32 and the filtered visual light forms an image on the CCD 33. The CCD 33 converts the formed optical image into electric signals, and transmits the signals to the matrix operation circuit 34.

A complementary color filter is formed on the CCD 33, and light of different colors passed through the color filter are incidence on the respective pixels, thereby image signals of different color components are generated.

The electric signals are inputted to the matrix operation circuit 34, from which a luminance signal Y, and color difference signals R-Y and B-Y are outputted. The recorder signal processing circuit 35 converts the inputted image signals (i.e., the luminance signal Y and the color difference signals R-Y and B-Y) into signals of digital video format and provides the converted signals to the recorder 36 where the signals are recorded on a recording medium. At the same time, the signals of the digital video format are also outputted from the DIF 37. Further, the image signals are also sent to the finder 61 so that the user can confirm the sensed image.

Next, in a case of converting infrared light into image signals, when an operand indicating to switch to infrared operation mode is sent along with the control command "INFRARED" for switching between infrared/visual light operation modes to the DIF 37, the DIF 37 transmits the corresponding CTS to the microcomputer 38. In turn, the microcomputer 38 controls the actuator 39 so that the infrared filter 32 is removed out of a light path to the CCD 33 (moved in the direction shown in an arrow A in FIG. 22). Accordingly, light including infrared light incidents on the CCD 33 and converted into electric signals, then transmitted to the matrix operation circuit 34.

Next, the recorder signal processing circuit 35 is controlled so as to change the color difference signals R-Y and B-Y to express achromatic state, because a color component of infrared light is not visible. The subsequent processes are the same as those for processing image signals of visual light. Further, the microcomputer 38 turns off the finder 61 when the digital video camera 1 is controlled by the CTS.

As for the period of keeping the finder 61 turned off, it may be since the CTS is sent until the bus is reset. Alternatively, because the personal computer 3 may not always have a preview window, a CTS command for inquiring whether or not the personal computer 3 has a preview window may be provided, and the finder 61 may be controlled turned off only when the personal computer 3 has the preview window.

According to the sixth embodiment as described above, since the display device, such as a view finder and a liquid crystal panel, provided on the image sensing apparatus is turned off when a command for controlling and inquiring the state of the image sensing apparatus is transmitted from the control apparatus to the image sensing apparatus, it is possible to provide a remote-control image sensing system capable of saving energy, conventionally wasted in an unnecessary circuit, when the image sensing apparatus is controlled via a communication line, in addition to the effects as those of the third to fifth embodiments.

It should be noted that in the aforesaid first to sixth embodiments, the CCD is used as a device for converting an optical image to electric signals; however, the present invention is not limited to this, and any kinds of available devices, e.g., a MOS type photoelectric conversion device, may be used.

Further, in the aforesaid embodiments, the communication is performed in a method conforming to the IEEE 1394 standard, however, other communication methods may be used instead.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:
   an image sensor, capable of sensing an image in a first scanning method and a second scanning method selectively, adapted to sense the image of an object and outputting an image signal;
   a selection device adapted to select either the first scanning method or the second scanning method;
   an electronic flash for illuminating the object;
   a control device adapted to control timing of flashing said electronic flash in accordance with either the first or second scanning method selected by said selection device; and
   wherein an image signal is read out from said image sensor at a time to obtain a single image in the first scanning method, and image signals are read out in division over a plurality of fields to obtain a single image in the second scanning method, and said control device controls said electronic flash to flash once for each filed when the second scanning method is selected.

2. The image sensing apparatus according to claim 1, wherein, when the first scanning method is selected, said control device controls said electronic flash to flash once for each time to obtain a single image.

3. The image sensing apparatus according to claim 1, further comprising a designation device adapted to designate whether or not to use said electronic flash.

4. The image sensing apparatus according to claim 3, wherein said designation device performs the designation on the basis of exposure control operation performed for controlling exposure of said image sensor.

5. The image sensing apparatus according to claim 1, further comprising a display for displaying a designated content designated by said designation device.

6. The image sensing apparatus according to claim 1, wherein said selection device selects either the first or second scanning method on the basis of a selection signal inputted from outside.

7. The image sensing apparatus according to claim 1, wherein said control device controls the flash operation on the basis of a control signal inputted from outside.

8. The image sensing apparatus according to claim 1, further comprising transmission unit adapted to transmit the image signal obtained by said image sensor.

9. The image sensing apparatus according to claim 1, further comprising a display for displaying a selection result by said selection device.

10. The image sensing apparatus according to claim 1, wherein the first scanning method is progressive scanning method and the second scanning method is interlace scanning method.

11. An image sensing method comprising:
    a selection step of selecting either a first scanning method or a second scanning method;
    a control step of controlling timing of flashing an electronic flash in accordance with either the first or second scanning method selected in said selection step; and
    an image sensing step of sensing an image of an object in either the first or second scanning method selected in said selection step and outputting the image signal; and
    wherein an image signal is read out at a time to obtain a single image in the first scanning method, and image signals are read out in division over a plurality of fields to obtain a single image in the second scanning method, and in said control step, said electronic flash is controlled to flash once for each field when the second scanning method is selected.

12. The image sensing method according to claim 11, wherein when the first scanning method is selected, the electronic flash is controlled to flash once for each time to obtain a single image.

13. The image sensing method according to claim 11, further comprising a designation step of designating whether or not to use the electronic flash.

14. The image sensing method according to claim 13, wherein, in said designation step, the designation is made on the basis of exposure control operation performed for controlling exposure in said image sensing step.

15. The image sensing method according to claim 13, further comprising a display step of displaying a designated content designated in said designation step.

16. The image sensing method according to claim 11, further comprising a reception step of receiving a selection signal from an external device,
    wherein, in said selection step, either the first or second scanning method is selected on the basis of the selection signal received in said reception step.

17. The image sensing method according to claim 11, further comprising a reception step of receiving a control signal from an external device,
    wherein, in said control step, the electronic flash is controlled on the basis of the control signal received in said reception step.

18. The image sensing method according to claim 11, further comprising a transmission step of transmitting the image signal obtained in said image sensing step.

19. The image sensing method according to claim 11, further comprising a display step of displaying a selection result in said selection step.

20. The image sensing method according to claim 11, wherein the first scanning method is progressive scanning method and the second scanning method is interlace scanning method.

21. A computer program product comprising a computer usable medium having computer readable program code means embodied in said medium for controlling an image sensing apparatus, said product including:

first computer readable program code means of a selection step for selecting either a first scanning method or a second scanning method;

second computer readable program code means of a control step for controlling timing of flashing an electronic flash in accordance with either the first or second scanning method selected in said selection step; and third computer readable program code means of an image sensing step for sensing an image of an object in either the first or second scanning method selected in said selection step and outputting an image signal;

wherein an image signal is read out at a time to obtain a single image in the first scanning method, and image signals are read out in division over a plurality of fields to obtain a single image in the second scanning method, and said third computer readable program code means controls said electronic flash to flash once for each field when the second scanning method is selected.

22. The computer product according to claim 21, wherein when the first scanning method is selected, the electronic flash is controlled to flash once for each time to obtain a single image.

23. The computer program product according to claim 21, further comprising fourth computer readable program code means of a designation step for designating whether or not to use the electronic flash.

24. The computer program product according to claim 23, wherein, in said designation step, the designation is made on the basis of exposure control operation performed for controlling exposure in said image sensing step.

25. The computer program product according to claim 23, further comprising fifth computer readable program code means of a display step for displaying a designated content designated in said designation step.

26. The computer program product according to claim 21, further comprising fourth computer readable program code means of a reception step for receiving a selection signal from an external device, wherein, in said selection step, either the first or second scanning method is selected on the basis of the selection signal received in said reception step.

27. The computer program product according to claim 21, further comprising fourth computer readable program code means of a reception step for receiving a control signal from an external device, wherein, in said control step, the electronic flash is controlled on the basis of the control signal received in said reception step.

28. The computer program product according to claim 21, further comprising fourth computer readable program code means of a transmission step for transmitting the image signal obtained in said image sensing step.

29. The computer program product according to claim 21, further comprising fourth computer readable program code means of a display step for displaying a selection result in said selection step.

30. The computer program produce according to claim 21, wherein the first scanning method is progressive scanning method and the second scanning method is interlace scanning method.

31. A control apparatus for controlling an image sensing apparatus comprising:

an image sensor, capable of sensing an image in a first scanning method and a second scanning method, selectively, adapted to sense the image of an object and outputting an image signal;

a selection device adapted to select either the first scanning method or the second scanning method;

an electronic flash adapted to illuminate the object; and a control device adapted to control timing of flashing said electronic flash in accordance with either the first or second scanning method selected by said selection device, wherein an image signal is read out at a time to obtain a single image in the first scanning method, and image signals are read out in division over a plurality of fields to obtain a single image in the second scanning method, said control apparatus comprising a transmission unit adapted to transmit a selection signal to said selection device.

32. The control apparatus according to claim 31, wherein when the first scanning method is selected, said control device controls said electronic flash to flash once for each time to obtain a signal image.

33. The control apparatus according to claim 31, further comprising designation device adapted to designate whether or not to use said electronic flash.

34. The control apparatus according to claim 33, wherein said designation device performs the designation on the basis of exposure control operation performed for controlling exposure of said image sensor.

35. The control apparatus according to claim 33, further comprising a display adapted to display a designated content designated by said designation device.

36. The control apparatus according to claim 31, wherein said selection device selects either the first or second scanning method on the basis of a selection signal inputted from the control apparatus.

37. The control apparatus according to claim 31, wherein said control device controls the flash operation on the basis of a control signal inputted from the control apparatus.

38. The control apparatus according to claim 31, further comprising reception device adapted to receive the image signal obtained by said image sensor.

39. The control apparatus according to claim 31, further comprising a display adapted to display a selection result by said selection device.

40. The control apparatus according to claim 31, wherein the first scanning method is progressive scanning method and the second scanning method is interlace scanning method.

* * * * *